United States Patent

Simmons

[15] 3,646,693

[45] Mar. 7, 1972

[54] IMPROVED ELEVATOR CONTROL FOR EARTH-MOVING APPARATUS

[72] Inventor: Lovel R. Simmons, M-R-S Manufacturing Co., Flora, Miss. 39071

[22] Filed: Feb. 2, 1970

[21] Appl. No.: 12,489

Related U.S. Application Data

[62] Division of Ser. No. 685,009, Nov. 22, 1967, Pat. No. 3,521,388.

[52] U.S. Cl. .................................... 37/8, 37/124
[51] Int. Cl. ........................................ E02f 1/00, B60p 1/38
[58] Field of Search .............................. 37/4, 7, 8, 126, 129

[56] References Cited

UNITED STATES PATENTS

| | | |
|---|---|---|
| 2,464,098 | 3/1949 | Pittlick ........................................ 37/8 |
| 3,048,934 | 8/1962 | Hancock ...................................... 37/8 |
| 3,170,254 | 2/1965 | Martin ......................................... 37/8 |
| 3,210,868 | 10/1965 | Liess ........................................... 37/8 |
| 3,331,149 | 7/1967 | Rapp ........................................... 37/8 |
| 3,381,396 | 5/1968 | Klein ........................................... 37/8 |
| 3,474,548 | 10/1969 | Miller .......................................... 37/8 |
| 3,484,960 | 12/1969 | Kokaly et al. ................................ 37/8 |

Primary Examiner—Robert E. Pulfrey
Assistant Examiner—Clifford D. Crowder
Attorney—Olson, Trexler, Wolters & Bushnell

[57] ABSTRACT

Apparatus for loading and emptying earth-moving and scraping vehicles of a mobile type, the vehicle comprising a front opening container or bowl with a loading elevator structure in the forward end and an operable bottom or floor for dumping materials from the bowl. The elevator is carried by arms pivoted to the bowl such that the elevator is free for both pivotal and translatory movement relative to the arms.

15 Claims, 25 Drawing Figures

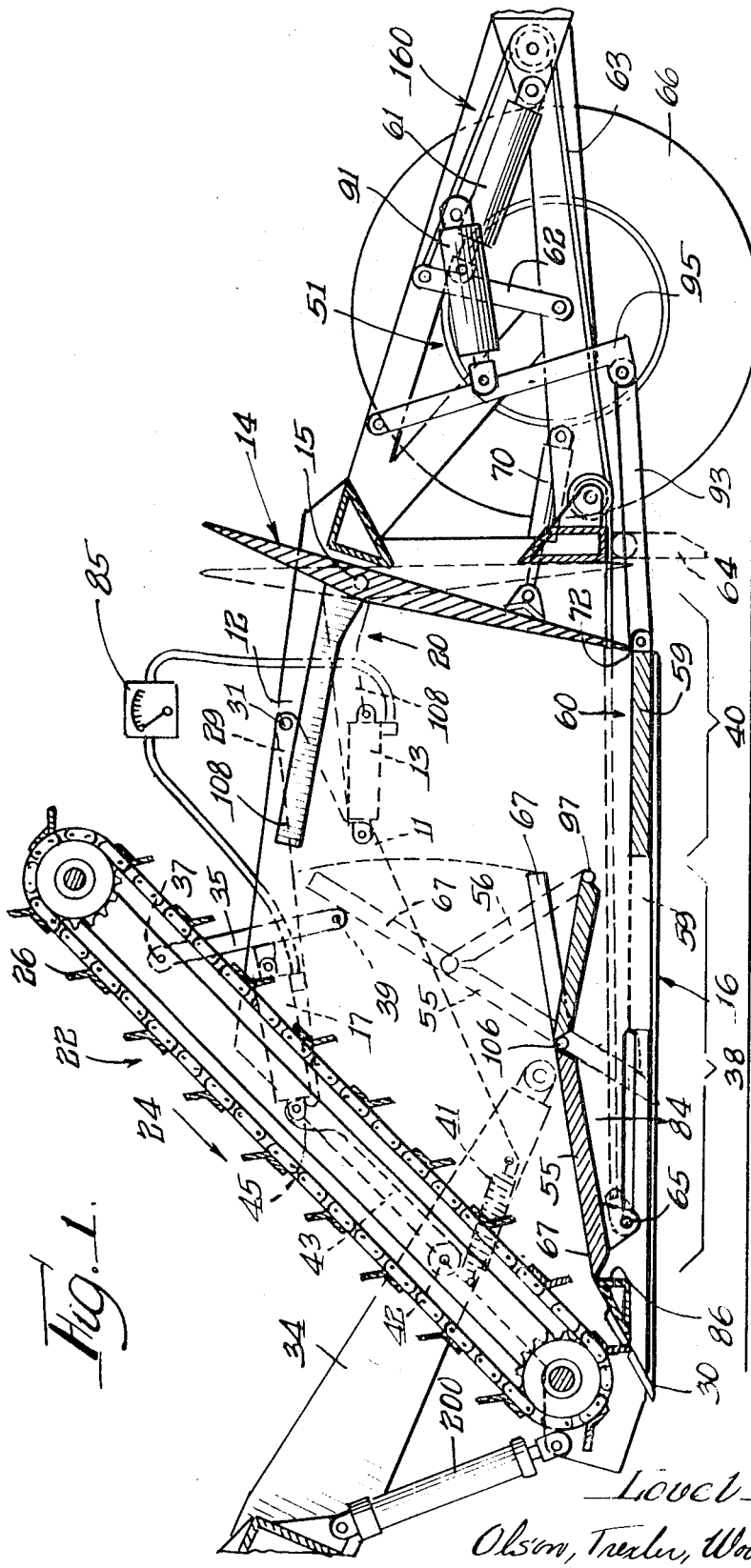

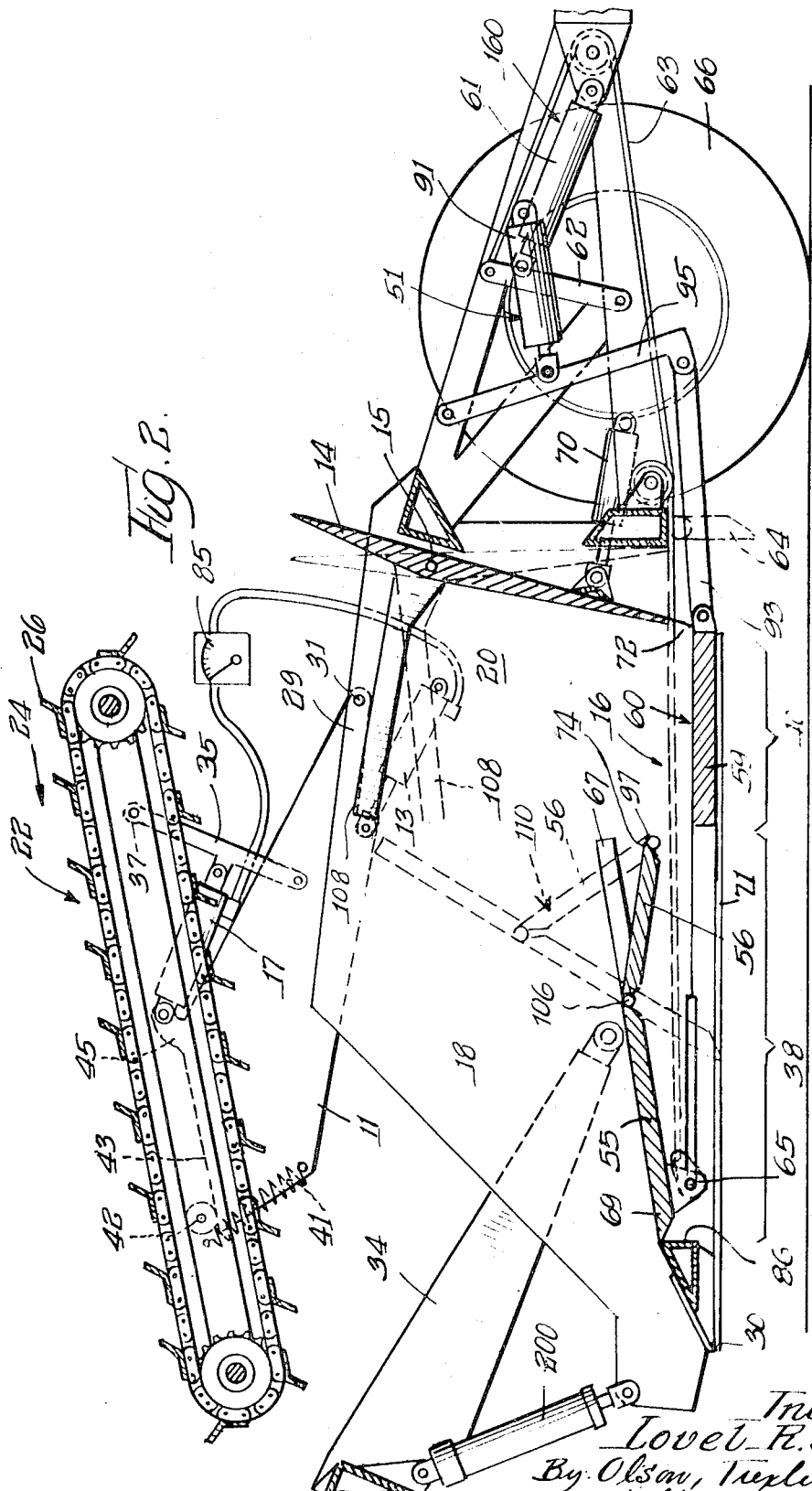

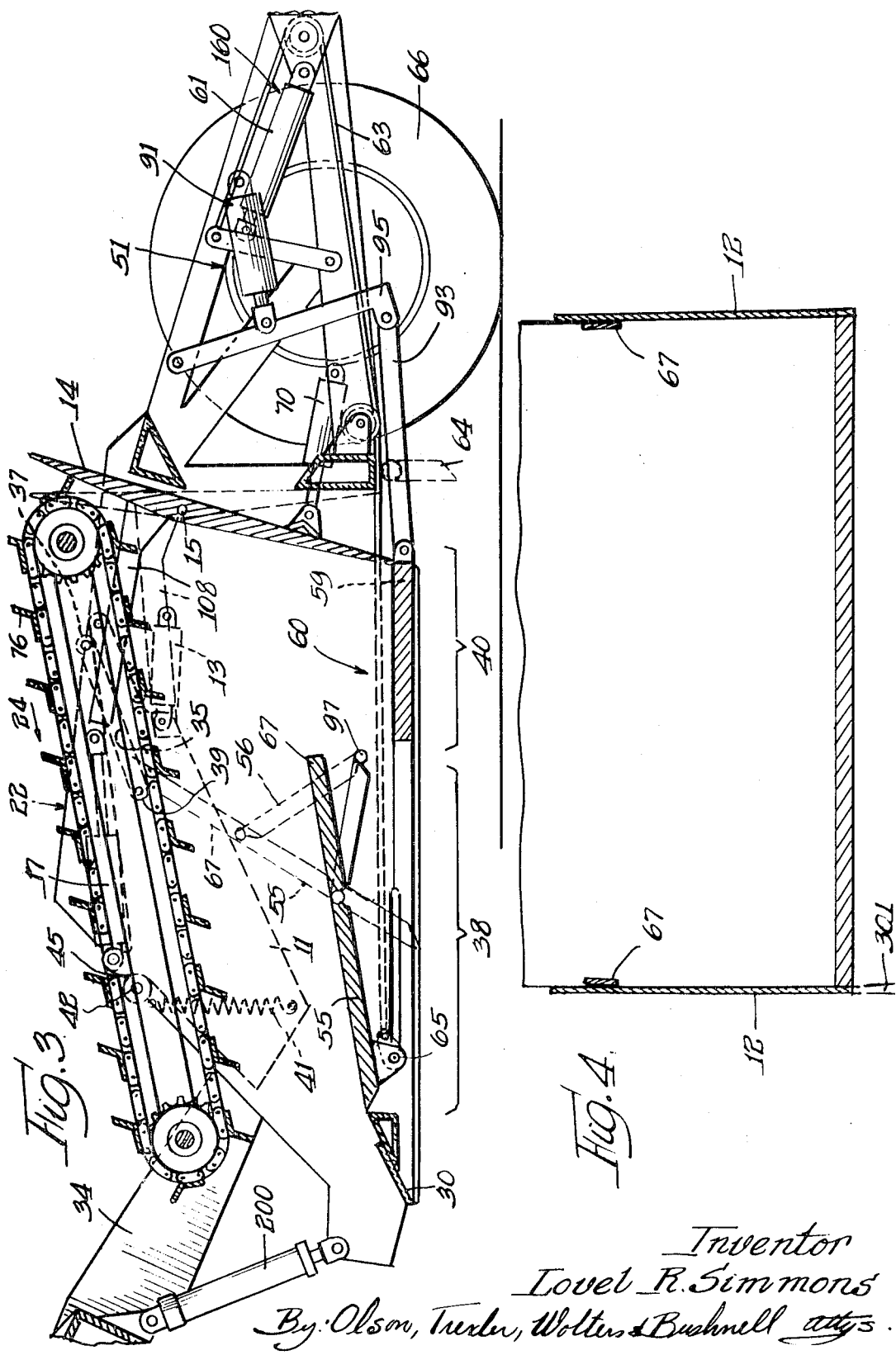

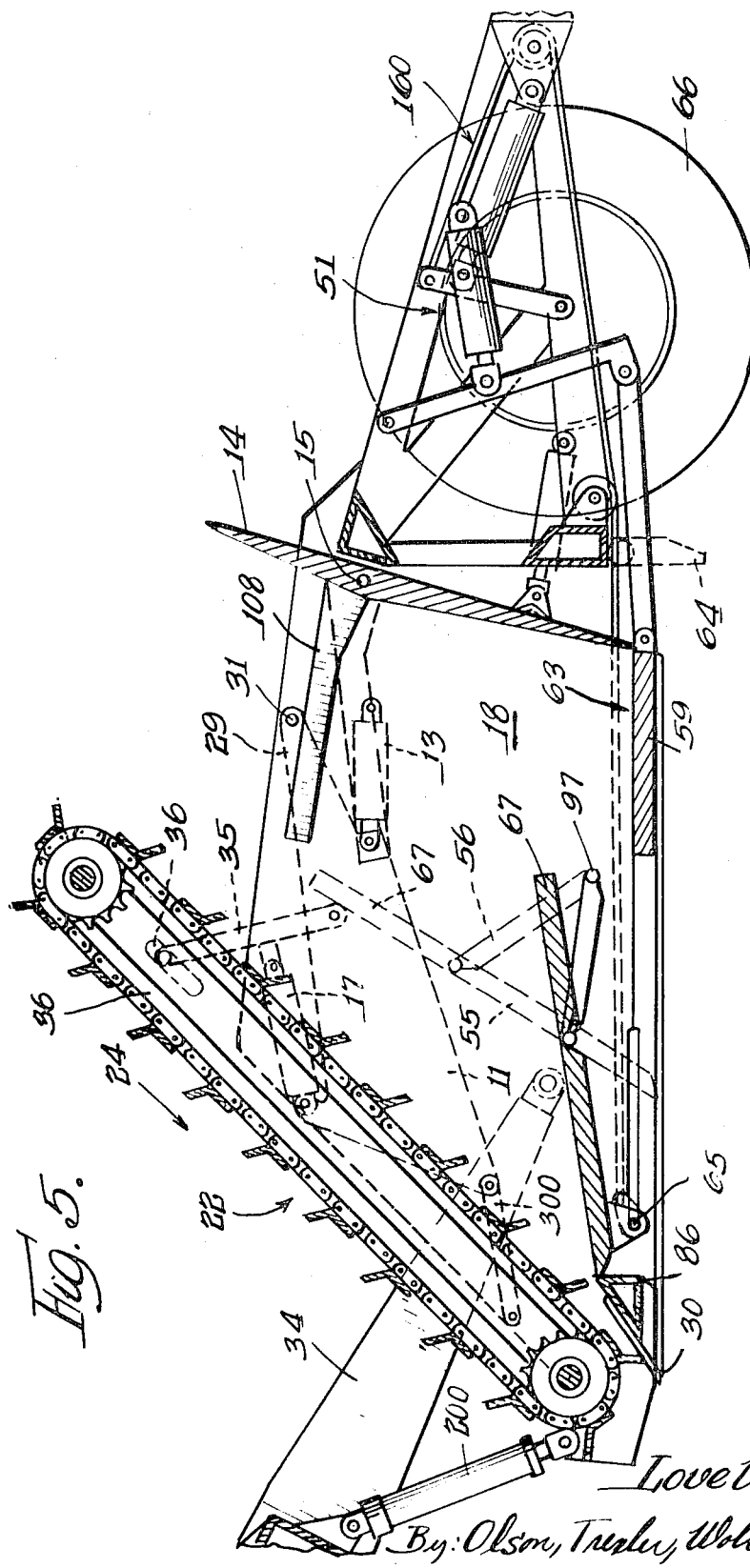

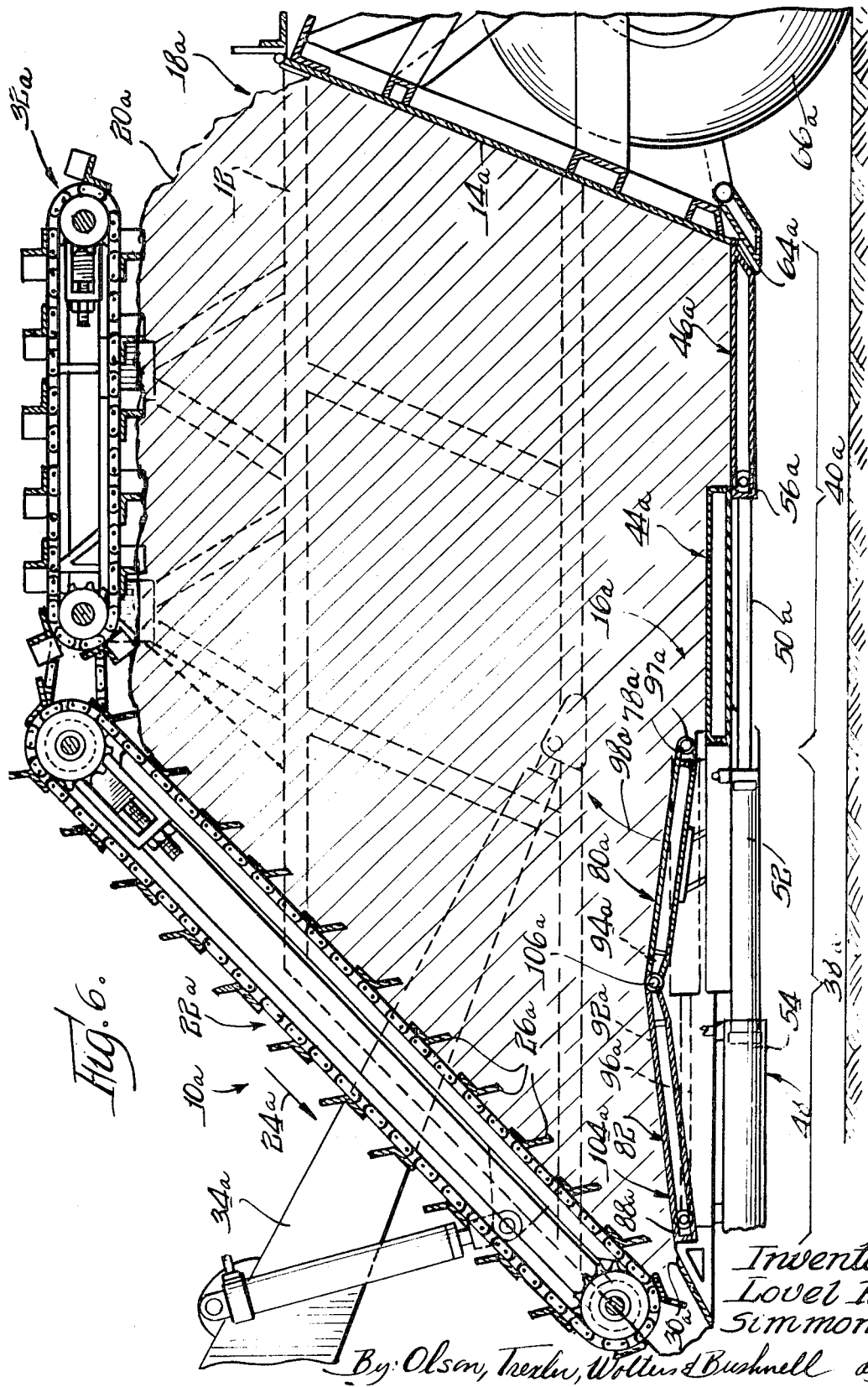

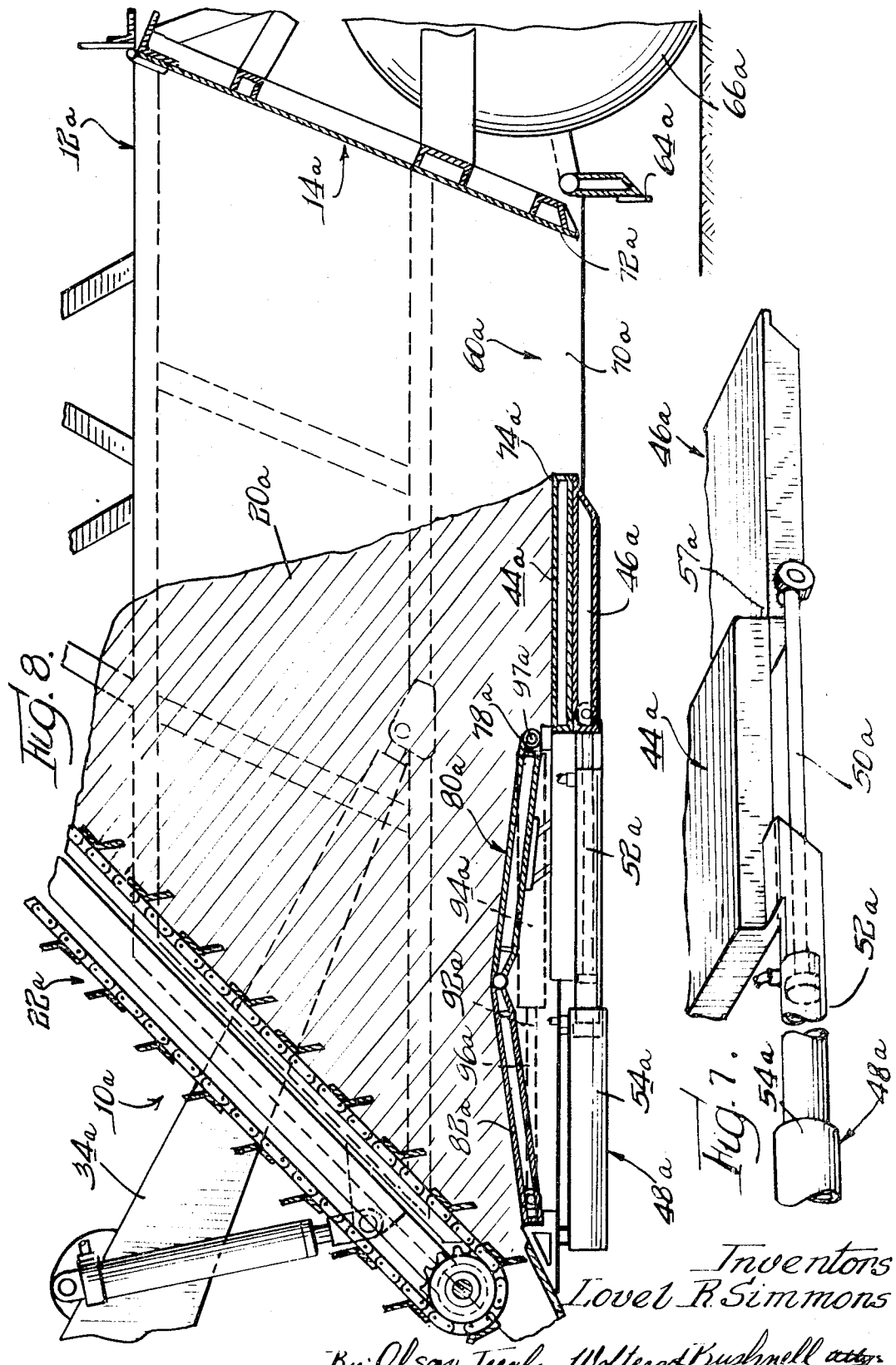

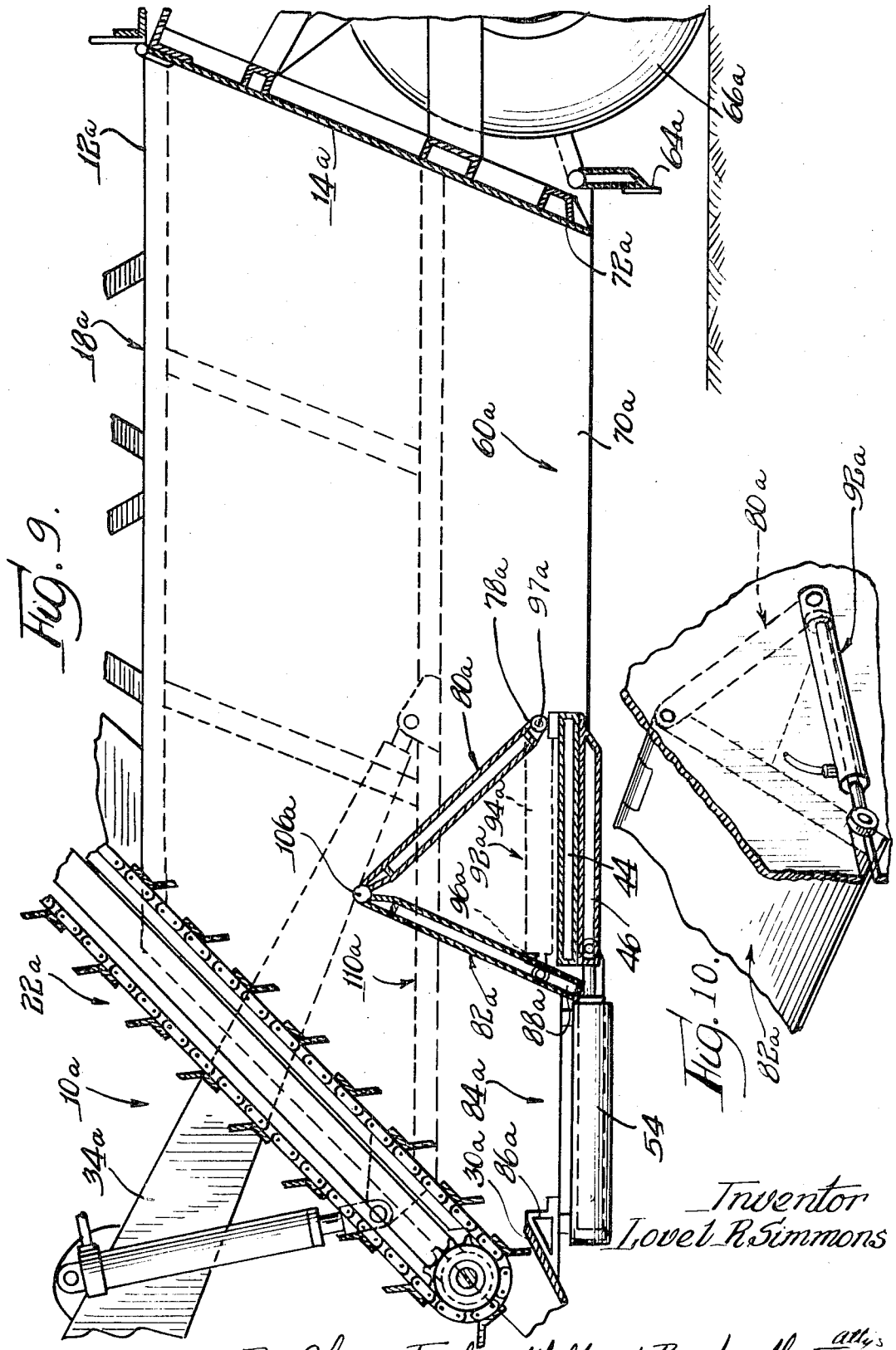

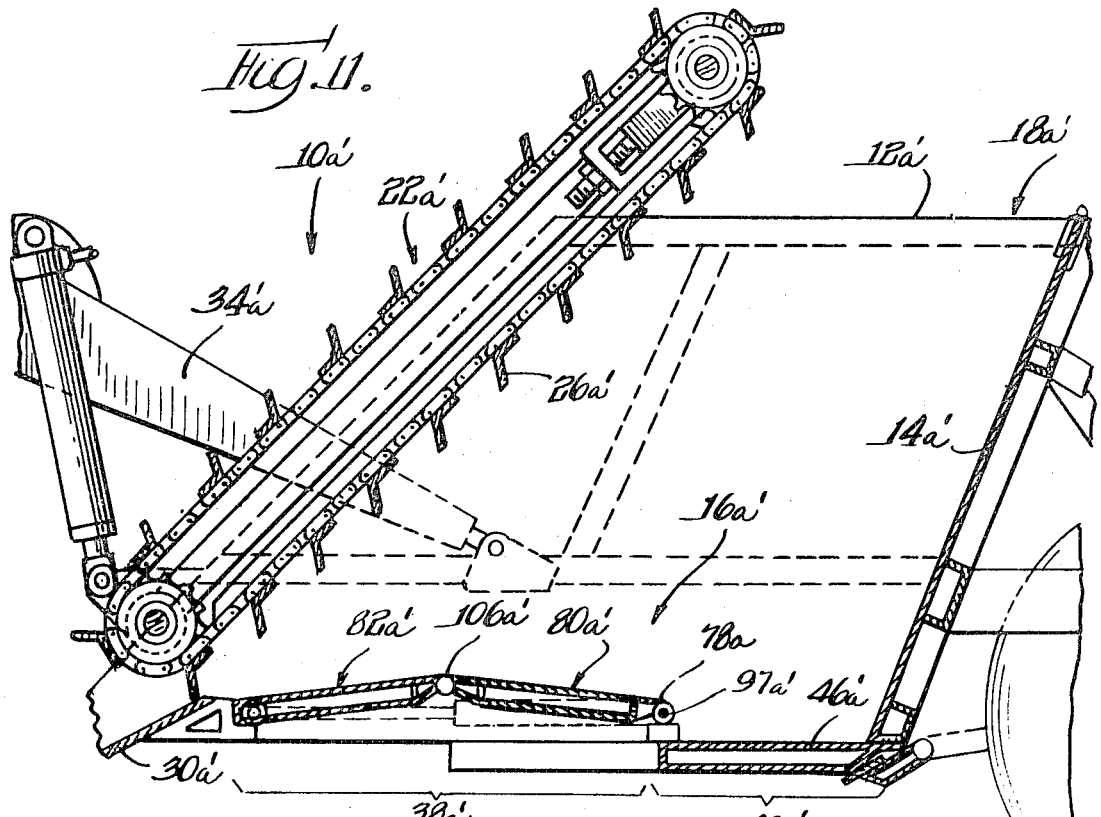
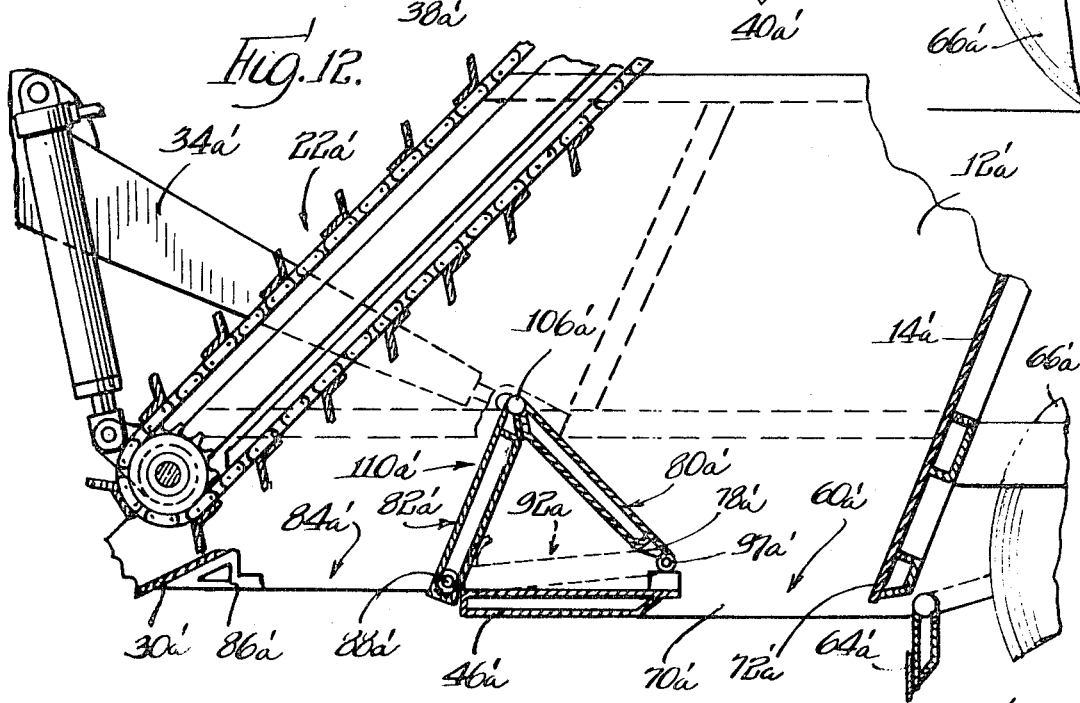

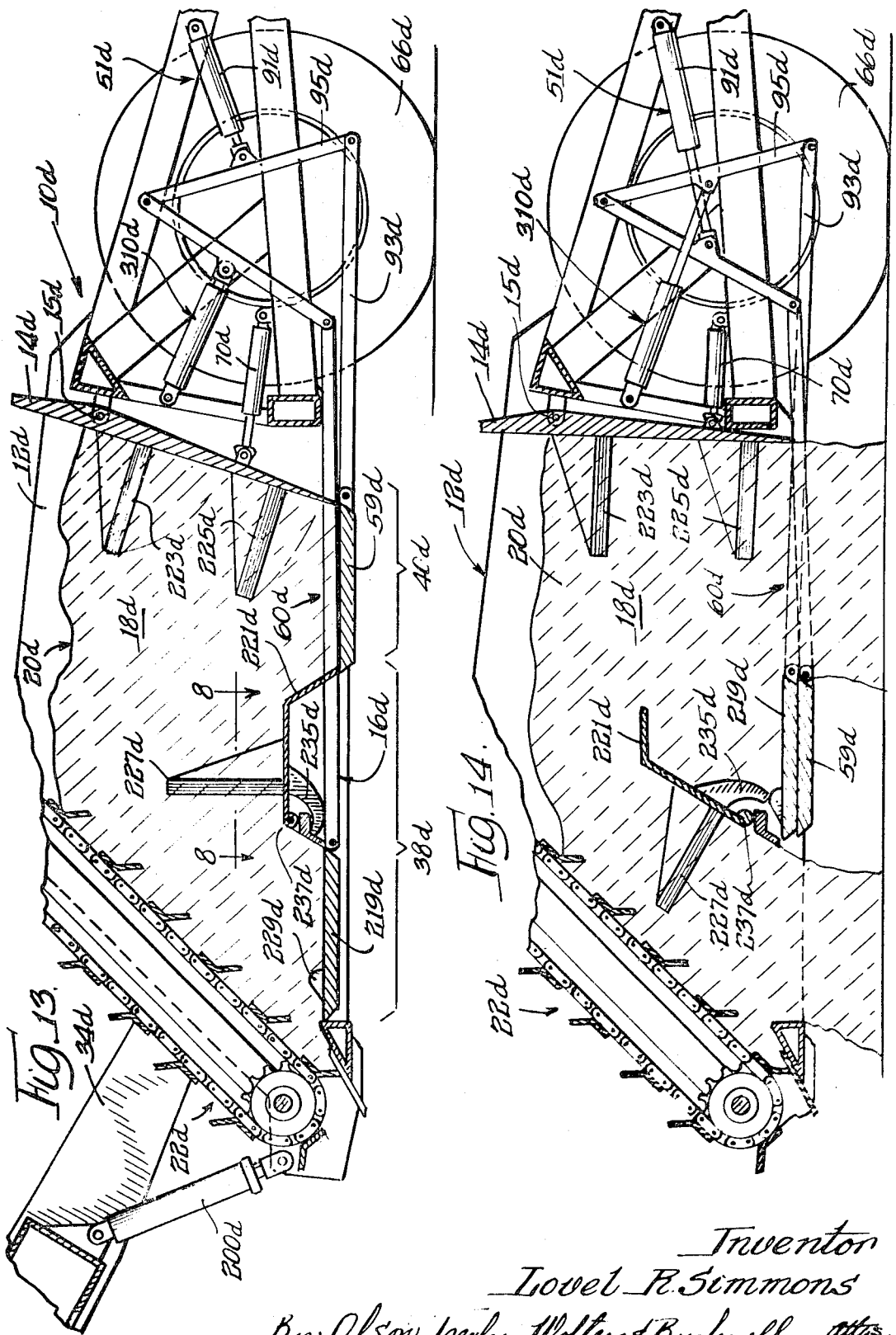

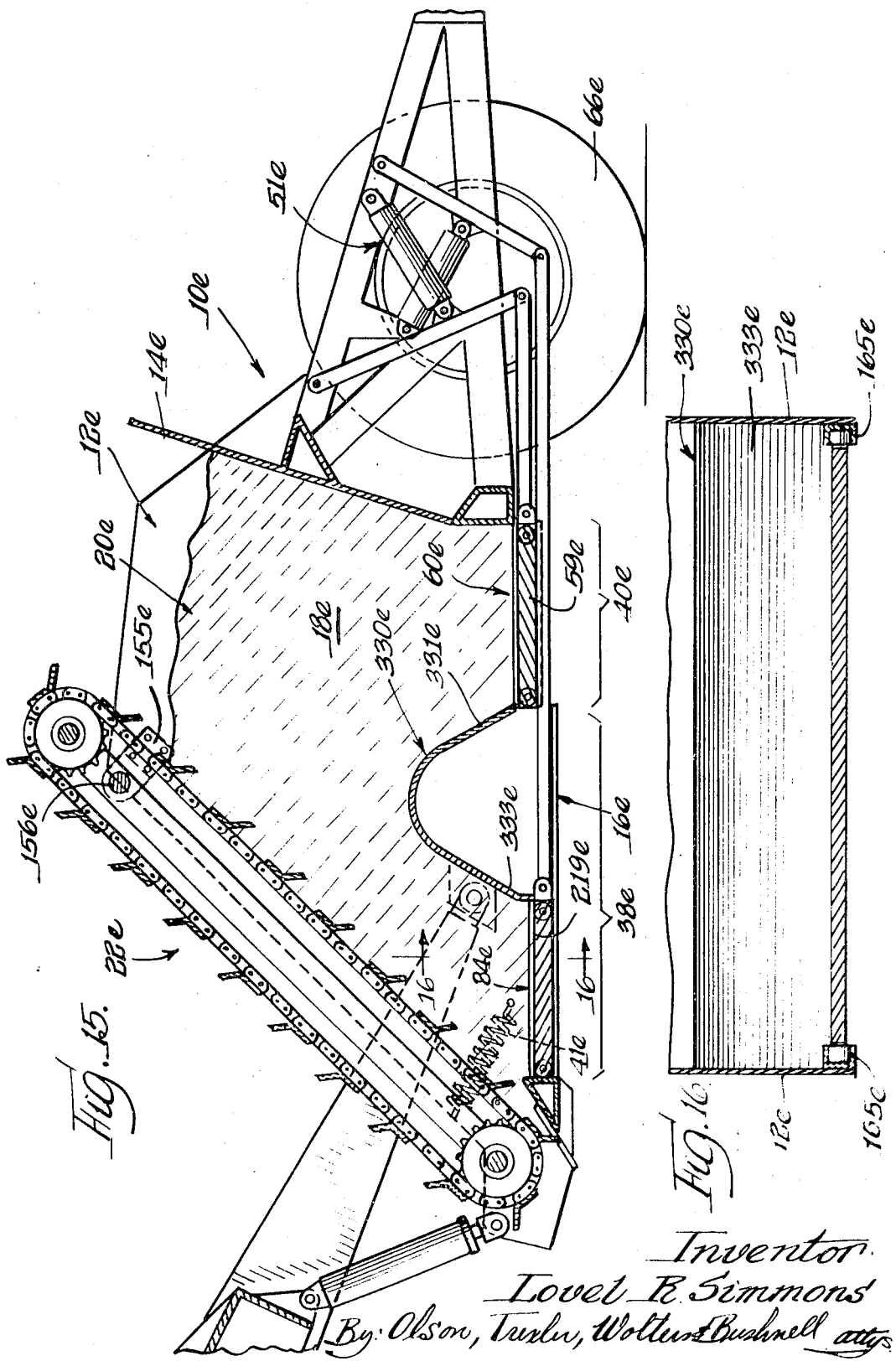

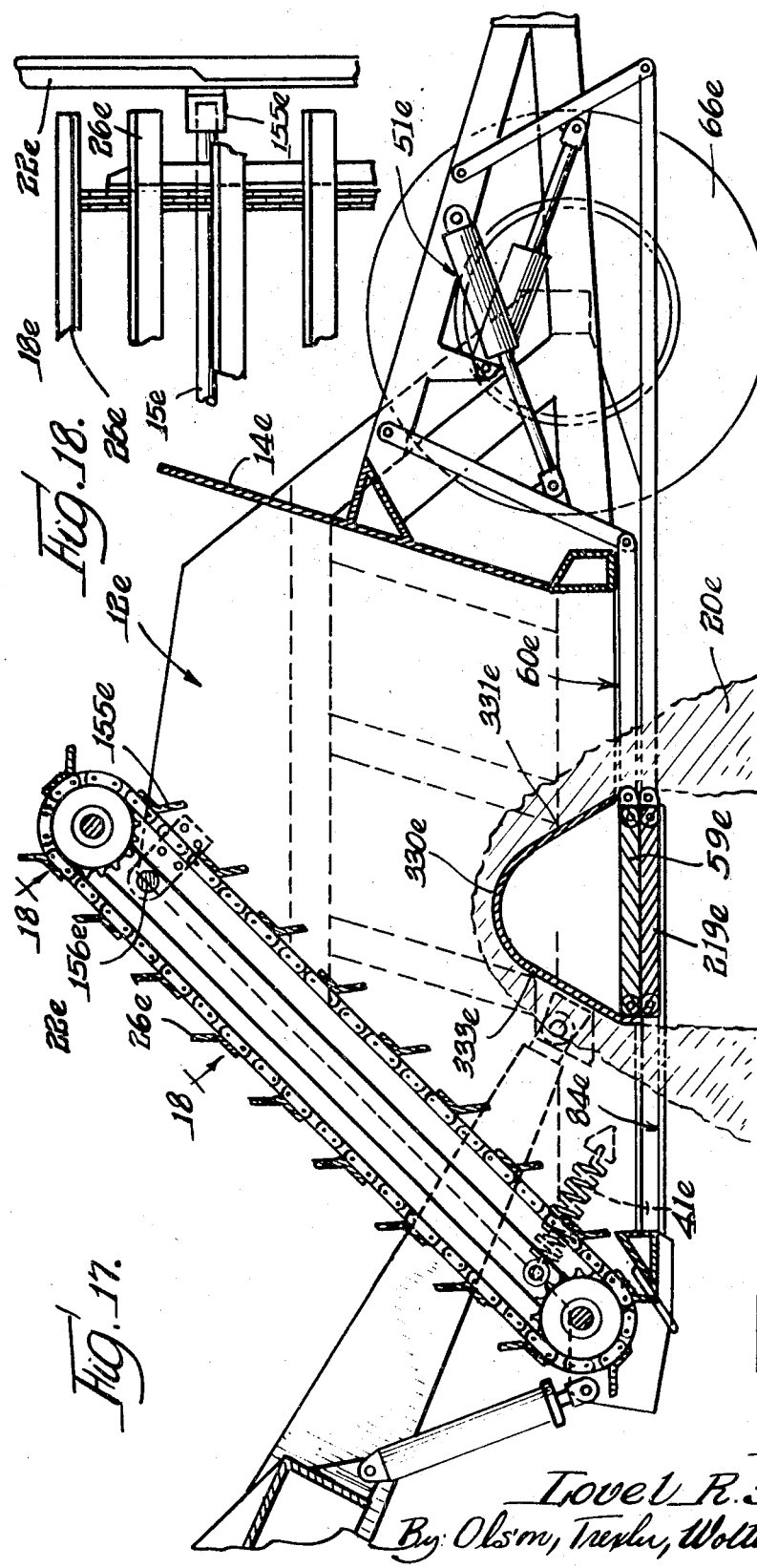

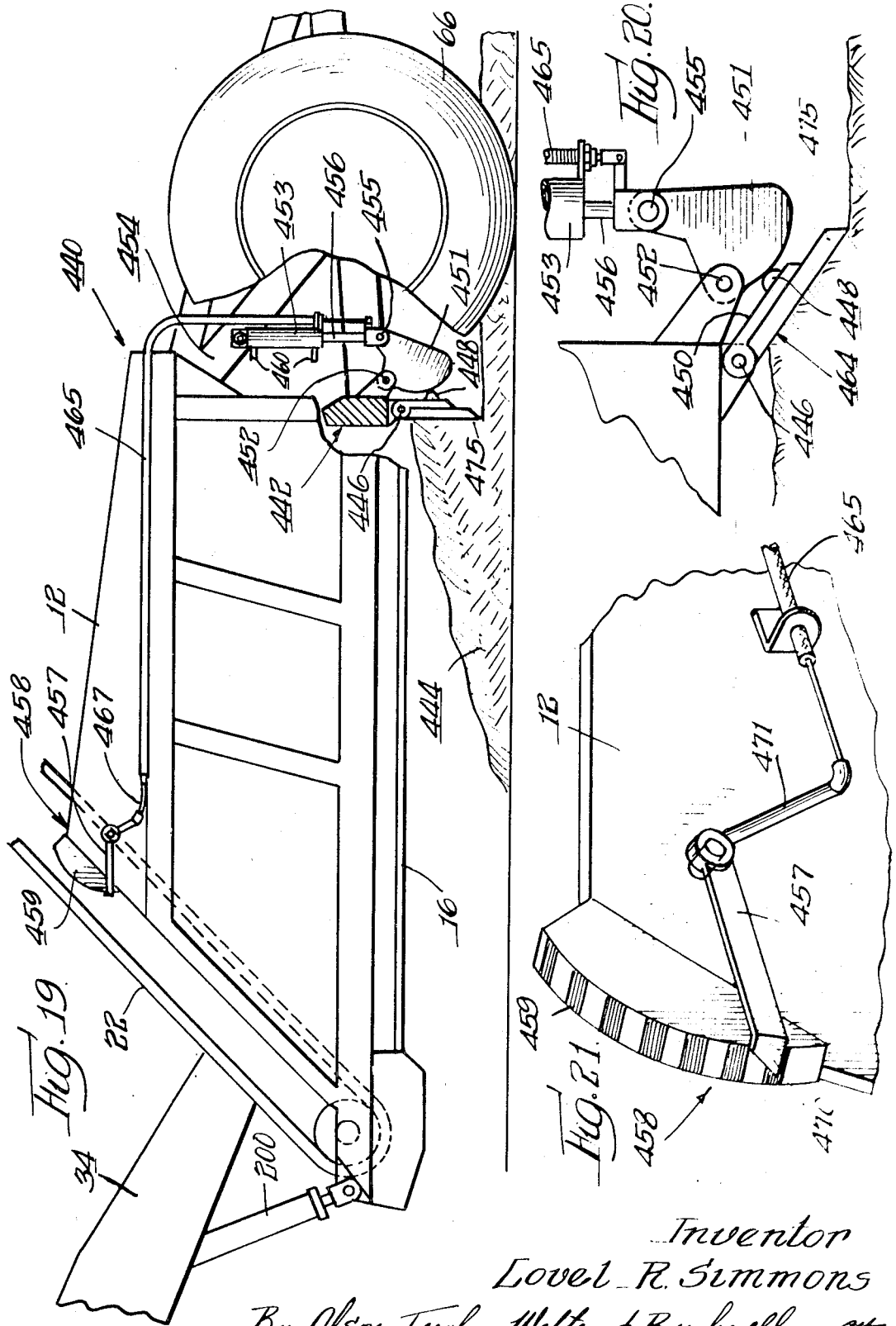

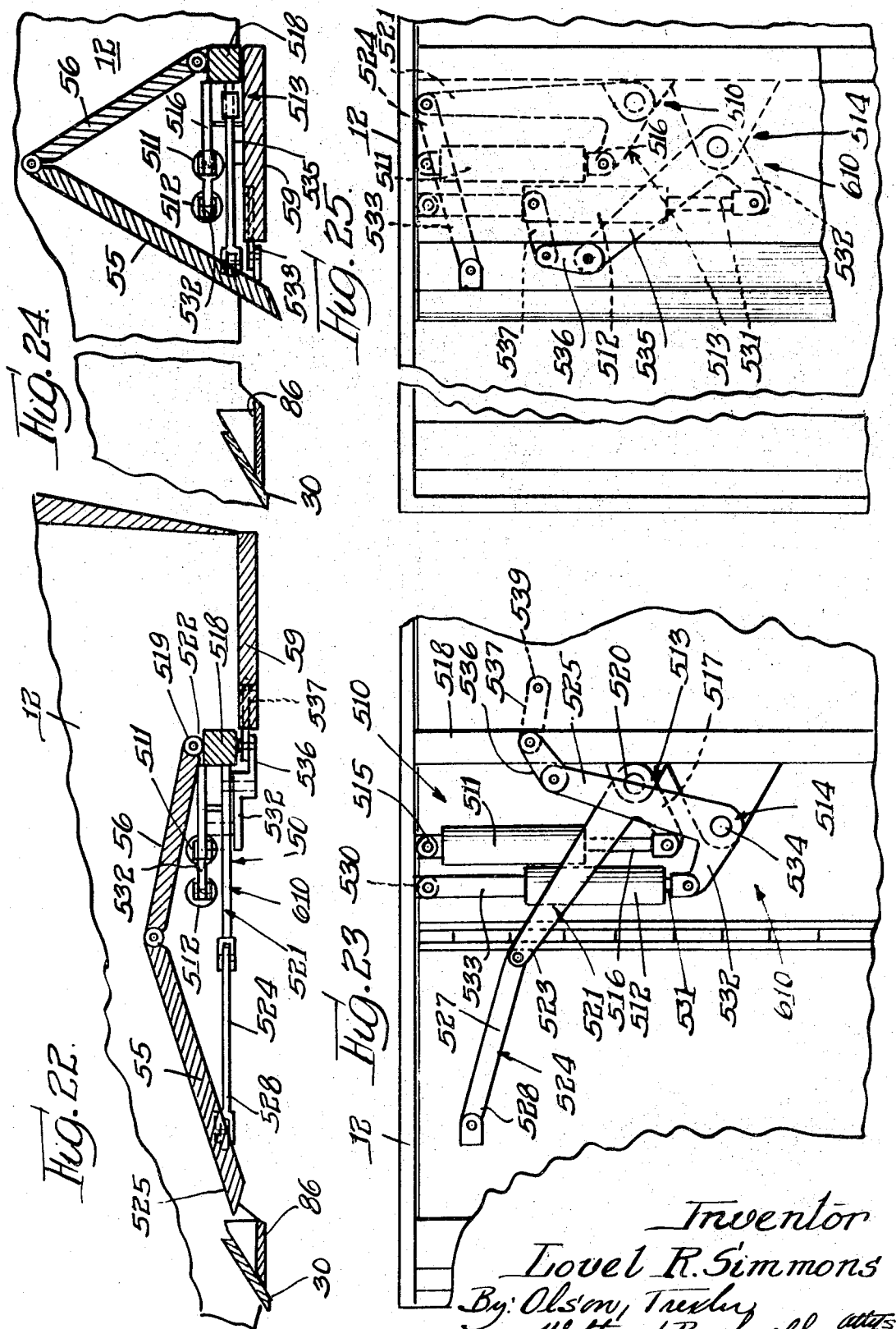

IMPROVED ELEVATOR CONTROL FOR EARTH-MOVING APPARATUS

CROSS-REFERENCE TO RELATED APPLICATION

This application is a division of U.S. application Ser. No. 685,009, filed Nov. 22, 1967, now U.S. Pat. No. 3,521,388.

BACKGROUND OF THE INVENTION

This invention relates generally to vehicles for scraping, loading, transporting and discharging earth and the like material, and more particularly to an improved method and apparatus for lading and emptying earth-moving and scraping machines.

Large vehicles which include elevating scraper-type loaders are used to transport bulk quantities of materials. In some cases, however, where the consistency of the material to be loaded is lumpy, such as by inclusion of boulders, rocks, etc., the material cannot pass by the lower portion of the elevator and consequently cannot be loaded into the vehicle. Some prior art vehicles have employed loading elevators which are deflectable at the lower end portion thereof so that when a larger piece of material is encountered in the loading process, the lower end of the elevator moves upwardly to allow the material to pass beneath.

While this last-mentioned change has been of considerable help in this problem, the deflectability of the prior art elevator member is limited, and consequently very larger material remains virtually unloadable by means of an elevating scraper this Thus, when the need arises to load and unload large, lumpy earth material, one commonly uses a conventional push-assisted loader which, employing no elevating scraper, has the advantage of a large incoming opening. However, this requires additional power.

A drawback in the case of the last-mentioned type of loaders, as well as in the prior art elevating scrapers which handle earth materials of a normal consistency, arises in the unloading or dumping of the material carried therein. In prior art vehicles the material is emptied at the forward end of the bowl or container thereof. This is commonly accomplished by pivoting the bowl up about the front edge or by the use of a generally upright ejector or pusher plate, which forms a rear wall of the container, which is moved forwardly to discharge the materials from the container. Either of these expedients shifts the materials forwardly along and past the bottom wall. While the above-described dumping or emptying process is being carried out, the vehicle is usually moved in a forward direction to spread the materials as they are being emptied from the container.

Because these prior art vehicles discharge the earth or other materials they carry from the forward end thereof, more power is required to pull the vehicle when performing the dumping process. This is true because as the earth materials are eliminated from the front end of the vehicle, the center of gravity thereof is shifted rearwardly. This rearward shift of the center of gravity substantially reduces a downward force which is transmitted to the prime mover by a tongue or yoke frame of the pulled vehicle while a comparable reduction is not made in the weight carried by the wheels of the earth-moving vehicle. Consequently, the weight on the rear wheels or tracks of the prime mover is reduced while the weight on the wheels of the earth-moving vehicle is decreased and rolling resistance of the earth-moving vehicle remains substantially constant. Therefore, the prime mover often has difficulty in maintaining traction while pulling the prior art vehicle and dumping material from the bottom of the vehicle.

Prior art earth-moving vehicles have also encountered difficulties in emptying sticky earth materials, such as wet gumbo and clay soils. As the materials are moved forwardly by the ejector plate, the sticky materials are compressed between the elevator structure for loading the vehicle and the ejector plate. This compressing or hanging up of the sticky materials increases the time required for unloading the vehicle and results in an uneven spreading of the materials as they are emptied therefrom.

Therefore, it is a general object of this invention to provide an improved apparatus which overcomes the aforementioned limitations of prior art constructions and methods for loading large lumpy earth material and for dumping material generally from the bottom of a vehicle.

It is a specific object of this invention to provide an earth-moving vehicle that combines the advantages of an improved elevating scraper-type vehicle and the conventional push-assisted loader-type vehicle in a single machine.

It is another object of this invention to provide an earth-moving vehicle having a loading elevator which can be positively raised and positioned to provide a very large opening through which lumpy earth material may be loaded into the vehicle.

It is a further object of this invention to provide an earth-moving vehicle of the above-mentioned type wherein the elevator can be positively moved and controlled between substantially horizontal positions above the bowl or container of the vehicle so as to be able to rake material received in the bowl to the back thereof.

It is yet another object of the invention to provide an improved earth-moving machine which may be used for satisfactorily and efficiently loading and emptying earth materials of almost any consistency.

These and other objects and features of the invention will become more apparent upon a consideration of the following detailed description taken in connection with the accompanying drawings.

DESCRIPTION OF THE DRAWINGS

FIG. 1 is a side sectional view illustrating an earth-moving vehicle which combines the advantages of an elevating scraper-type vehicle and push-assisted loader-type vehicle according to the invention. The vehicle is provided with a movable bottom wall, shown in a closed position for supporting materials within the vehicle;

FIG. 2 is a side sectional view of the earth-moving vehicle of FIG. 1 which shows the positively operated elevator scraper raised to allow large, lumpy material to be push-loaded therein;

FIG. 3 is a side sectional view of the earth-moving vehicle of FIG. 1 which shows the positively operated elevator raised to a substantially horizontal position in which it may be used for raking material into the vehicle to the rear thereof;

FIG. 4 is a sectional view of the vehicle of FIG. 1 taken through the bowl, adjacent the rear wall thereof;

FIG. 5 is a side sectional view of a modified version of the earth-moving vehicle of FIG. 1;

FIG. 6 is a sectional view of a modified form of the invention wherein the vehicle is provided with a bottom wall according to the invention, which is shown in closed position for supporting materials within the vehicle and in addition includes an elevator and horizontal rearwardly extending conveyor;

FIG. 7 is an enlarged fragmentary perspective view illustrating a drive means for moving a pair of rearward panels from the closed position of FIG. 6 to an open position;

FIG. 8 is a sectional view, similar to FIG. 6, illustrating the vehicle with a rearwardmost panel of the bottom wall in open position to provide an opening through which materials can be at least partially emptied from the vehicle;

FIG. 9 is a sectional view, similar to FIGS. 6 and 8, illustrating the vehicle with the entire bottom wall thereof in an open position;

FIG. 10 is an enlarged fragmentary perspective view further illustrating the interrelationship of the forward panels in the open position, the rearward panels having been omitted from FIG. 10 for purposes of clarity;

FIG. 11 is an enlarged sectional view, similar to FIG. 6, illustrating a modified version of the vehicle of FIG. 6, wherein a bottom wall of the vehicle has a single rearward panel and a pair of forward panels all of which are shown in a closed position;

FIG. 12 is a sectional view of the vehicle of FIG. 11 illustrating the rearward panel and forward panels in an open position for emptying materials from the vehicle;

FIG. 13 is a side sectional view of another embodiment of the earth-moving vehicle according to the invention wherein a bottom wall of the vehicle comprises a forwardly and rearwardly sliding panel, a center section including a bowl wiper, located between the sliding doors, and a pivotally mounted rear wall including a pair of bowl wipers, all of which are shown in a closed position;

FIG. 14 is a side sectional view of the vehicle of FIG. 13 wherein the bottom wall and rear wall have been moved to an open or dumping position;

FIG. 15 is a side sectional view of still another embodiment of a vehicle for moving earth and other materials, the vehicle being similar to that shown in FIGS. 13 and 14 except that the rear wall and center section of the bottom wall are fixed, and the elevator scraper is pivotally mounted at the upwardly extending end thereof and movably mounted by means of a coil spring at the downwardly extending end thereof;

FIG. 16 is a cross-sectional view of the vehicle of FIG. 15 taken along the lines 16—16 therein;

FIG. 17 is a side sectional view of the vehicle of FIG. 15 with the forward and rear sliding doors shown in an open position;

FIG. 18 is a fragmentary cross-sectional view of the vehicle of FIG. 17 taken along the lines 18—18 thereof;

FIG. 19 is a side partially sectioned view of an embodiment of the earth-moving vehicle including a powered, adjustable leveling blade arrangement;

FIG. 20 is an enlarged view of the leveling blade of FIG. 19 shown in a high-level setting;

FIG. 21 is an enlarged perspective view of the indicator portion of the powered leveling blade arrangement of FIG. 19;

FIG. 22 is a side sectioned view of a preferred embodiment of a bottom door operating arrangement according to the invention in an unoperated or closed position;

FIG. 23 is a bottom plan view of the arrangement as shown in FIG. 22;

FIG. 24 is a side sectioned view of the embodiment of the bottom operating arrangement of FIG. 22 in an operated or open position; and FIG. 25 is a bottom plan view of the arrangement as shown in FIG. 24.

DETAILED DESCRIPTION

Referring now to the drawings more in detail, a vehicle 10 for moving earth and other materials is illustrated in FIG. 1. The vehicle 10 includes a pair of spaced-apart parallel longitudinally extending sidewalls 12 (of which only one is shown). The sidewalls 12 are joined by a rear wall 14 which extends transversely between the sidewalls and is pivotally connected to the sidewalls near the top thereof by means of a rod member 15 which extends between the sidewalls. A base or bottom wall 16 is supported by the sidewall 12 to define a bowl or container 18 into which earth and other materials 20 are loaded by an upwardly extending elevator 22 which is rotatably mounted near the top of the sidewalls through the medium of a pair of arm members 11. One end 29 of each arm member is pivotally attached to the sidewall by means of pins 31. Also an hydraulic cylinder 13 is pivotally attached to each arm member 11 and to the sidewall 12, near the point of attachment of end 29 of arm member 11. The attachment of the elevator 22 to the arm members 11 is accomplished by means of a normally substantially vertically extending bar 35, an end 37 of which is pivotally attached to the elevator 22 and the other end 39 of which is pivotally attached to arm member 11, near the center of the latter. Close to the center of bar 35 there is pivotally attached a second hydraulic cylinder 17, the other end of which is pivotally connected to a protruding or stop portion 45 of arm member 11. The lower end of elevator 22 is connected by means of a coiled spring 41 to the free end of the arm member 11, so that a small obstruction passing between the lower end of the elevator and the scraper blade 30 will cause the bottom portion of the elevator to swing outwardly and upwardly, thereby allowing the obstruction to pass or be removed so as not to damage the elevator. In addition to the coiled spring, a roller 42 is attached to elevator 22 at a point near to where spring 41 is attached. By means of roller 42, elevator 22 is supported at the lower end thereof by arm member 11. As will be described below, roller 42 rides on the free end 43 of arm member 11 which lies normally in parallel relation to the elevator 22.

The base wall 16 includes a forward section or end portion 38 and a rearward section or end portion 40. The rearward end portion or section 40 of the base wall 16, as shown in FIG. 1, is formed by a forwardly sliding panel 59 which is mounted for movement by an hydraulic drive assembly 51 of known construction. As can be seen, rearward panel 59 is connected to a first substantially horizontally extending arm 93 which in turn is pivotally connected to a substantially vertically extending arm 95, connected to an hydraulic cylinder 91. The forward section or end portion 38 comprises a forward panel 55 and a rear panel 56. These panels are hinged together at the rearward end of the forward panel and at the forward end of the rear panel, and the rear panel 56 is pivotally attached to the sidewalls 12 at a point 97 thereof near the center of base wall 16. An hydraulic-cylinder-pulley arrangement 160 is provided to operate the hinged panels 55 and 56. As can be seen in FIG. 1, hydraulic cylinder 61 is connected to a movable arm 62 which in turn is connected to a cord 63 preferably of steel construction extending to the forward end of the front panel 55 where it is attached by means of a pivotally connected fastener 65.

The back wall 14 of the vehicle 10, as described above, is pivotally connected to the sidewalls 12 near the top thereof by means of a rod member 15. Hydraulic cylinder 70 attached both to the pivotally connected rear wall 14 and to the vehicle 10 provides a means whereby door 14 may be rotatably moved rearwardly about rod member 15. It should be noted that while hydraulic cylinder arrangements are shown for operating the various moving panels of base wall 16 and rear wall 14, any suitable operating media may be used if desired.

Referring to FIGS. 1 through 3 of the drawings, a detailed description of the operation of the vehicle 10 will be given. To begin with yoke or connector frame 34 of vehicle 10, which is connected to the sidewalls 12, is connected at its other end to a prime mover or tractor (not shown) to pull the vehicle 10. The relationship between a vehicle such as 10 and the prime mover can be seen in U.S. Pat. No. 3,343,286 to Ray et al. When the prime mover or tractor is connected to yoke 34 the vehicle 10 is ready fro operation. As vehicle 10 is pulled forwardly by means of the prime mover, elevator 22 is rotated in the direction of the arrow 24 to lift earth and other materials 20 into the bowl 18 of the vehicle with a plurality of slats or bars 26 mounted on the elevator 22. A scraper blade 30 extends between the sidewalls 12 and is connected thereto to direct materials 20 upwardly for engagement by the slats 26 of the elevator 22. Through the use of hydraulic cylinders 13 and 17 preferably controlled by a common means 85, shown schematically in FIG. 1 of the drawings, the position of the elevator 22 relative to the blade 30 may be adjusted to accommodate the type of material which is to be loaded into container 18 of vehicle 10. As will be explained more fully below, the positioning of the elevator may be accomplished automatically through control 85, if desired. If the material to be loaded is of the large lumpy type, such as in the case of boulders, rocks, etc., the elevator 22 may be raised to an out-of-the-way position, such as shown in FIG. 2 of the drawings. This movement of elevator 22, as can be seen in FIG. 2, provides a large front opening to bowl 18 so that lumpy material can be forced over scraper blade 30 by the forward movement of vehicle 10 into bowl 18. If the material is very heavy, vehicle 10 may require a push tractor at the rear thereof, to assist the prime mover in propelling the vehicle 10 forwardly for loading. Through the use of hydraulic cylinder 200 attached to yoke 34 in vehicle 10 the blade 30 may be positioned relative to the earth so as to cut thereinto as desired, thereby scraping material as vehicle 10 is moved forward. In case of materials which are not extremely large or lumpy, elevator 22, through the operation of cylinder 17 alone, can be positioned nearly horizontally, as shown in FIG. 3, so as to provide a sizeable opening between the cutting edge of blade 30 and the bottom of the elevator 22. With the elevator 22 in this position, medium-sized earth material, such as boulders, etc., may be loaded into bowl 18 and may be raked to the rear of the bowl by means of elevator 22. The two positions of elevator 22 illustrated in FIGS. 2 and 3, respectively, are the extremes to which the elevator may be moved. However, through the use of control lever 85 which serves to operate hydraulic cylinder pairs 13 and 17, the elevator 22 may be positioned anywhere between these two extremes. In a preferred embodiment of an earth-moving vehicle, the control means 85, in combination with a sensing device within the bowl 18 can also be used to automatically change the position of the elevator from that shown in FIG. 3 to that shown in FIG. 1, and vice versa, as the bowl is loaded so as to be able to move the materials coming into the bowl towards the rear thereof as the rear of the bowl is filled. This in turn prevents materials from falling toward the front end of the vehicle and insures efficient filling of the bowl.

Referring once again to FIG. 2, it will be noted that hydraulic cylinder 13 is shown fully operated to rotate arm member 11 about pivot point 31 in a clockwise direction as shown therein. The roller 42 and coiled spring 41 as well as bar 35 and hydraulic cylinder 17 remain in their normal position, relative to arm member 11, as shown in FIG. 1 of the drawings. In FIG. 3, however, where elevator 22 is positioned substantially horizontally, through the operation of cylinder 17, arm member 11 has remained in its normal position, while roller 42 has rolled up the free end 43 of arm member 11 to a position adjacent protruding portion 45 of arm member 11 and spring 41 is completely outstretched. Also, it can be seen that bar 35 normally in a substantially vertical position, as shown in FIG. 1, has now assumed an almost horizontal position.

Upon completion of the loading process, the lower end of elevator 22 is preferably positioned in very close relation to scraper blade 30 which now will be raised by means of hydraulic cylinder 200 to avoid contact with the earth. The combination of movements will prevent materials already loaded into the bowl 18 from falling therefrom. Then, if desired, the earth materials may be transported in vehicle 10 to a dumping site.

Upon reaching its destination, the vehicle 10 is pulled into position to being spreading the materials in a desired location. As the vehicle 10 is pulled, rear sliding panel 59 is first moved forward by means of hydraulic assembly 51. As rear panel 59 is moved forward, a rear opening or aperture 60 defined by the lower end portion 71 of sidewalls 12, the lower end portion 72 of rear wall 14 and the rearward end portion 74 of panel 56, through which the materials in bowl 18 can be emptied from a rear portion of the vehicle 10, is formed. The material which was previously supported on the upper surface of rear panel 59 falls or is emptied downwardly through the opening 60. This material is followed by the material piled thereon in bowl 18. As the material falls through the opening 60 it is engaged by a leveling blade 64 which as shown in FIG. 1 of the drawings is mounted on the sidewalls 12 adjacent to rear wheels 66 of the vehicle 10. In a preferred embodiment of the earth-moving vehicle according to the invention, the leveling blade may be of a type which may be hydraulically operated so as to be adjustable arcuately about its fastening point. A blade arrangement of this type is shown in FIGS. 19–24 of the drawings and will be explained in greater detail below. The prime mover pulls the vehicle 10 forwardly on the rear wheels 66 so that the blade 64 levels and spreads the material emptied through the opening 60. Subsequent to the opening of sliding panel 59, the pivotally mounted rear vertical wall 14 is rearwardly swung open, as shown in dotted lines in FIG. 1 of the drawings, so that any material which might have been stuck to the sidewalls or to the rear wall now may fall through the opening 60 to be spread. The movement of the rear wall thereby removes a vertical support to material which has not been eliminated from the rear of bowl 18 so that through the force of gravity this material will now be removed therefrom. As rear wall 14 is moved, a wiper blade 108 connected substantially perpendicularly to the rear wall at the top thereof moves along the side walls so as to loosen any material which might stick to sidewalls 12. In addition to the above, the rearward movement of wall 14 enlarges the opening 60, making it possible for any material not already eliminated to be discharged from the rear of bowl 18.

This initial opening 60 enables material in the rear of vehicle 10 to be emptied first. Thus, the center of gravity of the load carried by the vehicle 10 is shifted forwardly and the weight carried by the rear wheels 66 is decreased, while there is a relatively small decrease in the load transmitted by the yoke 34 to the prime mover (not shown). The movement of panel 59 from its closed position, as shown in FIG. 1, to an open position beneath the rear panel 56 of forward section 38, (shown in dotted lines) provides an opening through which material is emptied to decrease the weight and, consequently, the rolling resistance of the rear wheels 66 of the vehicle 10. However, the weight transmitted to the prime mover is not substantially reduced, so that the rear wheels of the prime mover are pressed downwardly by the yoke frame 34 to maintain the traction capabilities of the prime mover.

After panel 59 and rearward wall 14 have been moved to their open positions, the front section 38 comprising forward panel 55 and rearward panel 56, are opened through hydraulic assembly 160. The opening of forward section 38 is accomplished by the operation of hydraulic cylinder 61 which through bar 62 pulls cord 63 attached to the front panel 55 by means of fastener 65, to the rear of the vehicle, thus rotating front panel 55 and rear panel 56 about the point 106 where they are hinged together, to almost vertical positions. As can be seen in FIG. 1 in dotted lines, front panel 55 and rear panel 56 of forward section 38 form a triangularly shaped structure 110, i.e., a structure having a triangularly shaped cross section when fully opened. The material directly supported by panel 55 is emptied from the vehicle at the forward end thereof through an opening 84 defined by the lower ends 71 of the sidewalls 12, a support member 86 for blade 30 and a forward end portion 69 of the panel 55, while the material supported by panel 56 is dumped through the opening 60 formed through the opening of panel 59 and enlarged by the rearward movement of rear wall 14. It will be noted that carried by panels 55 and 56 are side wipers 67 which upon the opening of panels 55 and 56 move along the interior of sidewalls 12 so as to remove any materials which might be sticking thereto. Through these movements as described the entire bowl 18 is substantially cleaned of materials loaded therein.

An additional aid in the complete discharge of earth materials from vehicle 10 is that the sidewalls 12 are toed inwardly at the top thereof. This can best be seen in FIG. 4 of the drawings. There, wipers 67 can be seen along the inside surface of sidewalls 12. Furthermore, it will be noted that sidewalls 12 are a greater distance apart at the bottom thereof than at the top. A preferred degree of incline of the sidewalls is approximately 2° from the vertical, as shown by angle 301, for this is adequate to prevent the materials from becoming packed together in bowl 18, while not substantially decreasing the overall volume thereof. If necessary, however, a greater or lesser amount of incline may be used.

Thus, due to the manner in which the vehicle 10 is unloaded i.e., the sequential opening of the respective movable panels of the base wall and rear wall of the vehicle as described above, the center of gravity of the vehicle is shifted forwardly upon the initial dumping of materials from the rear thereof. Furthermore, the rolling resistance of the rear wheels 66 of the vehicle 10 is reduced while the traction of the rear wheels of the prime mover remains virtually the same. Consequently, the prime mover is able to, without additional effort, pull the vehicle 10 at a relatively steady pace throughout the dumping process. Furthermore, the dumping is performed in a uniform, efficient manner.

Referring now to FIG. 5 of the drawings, there is shown a vehicle 10 similar to that shown in FIGS. 1 to 3 except that elevator 22 of the vehicle of FIG. 5 is attached to the arm members 11 in a slightly different manner. The attachment of the elevator 22 to the arm members therein is accomplished by slidably attaching bar 35 in a slotted aperture 36 at the upper end of elevator 22. The lower end of elevator 22, which as shown in FIGS. 1 through 3 is deflectably mounted by means of a coiled spring to arm members 11, is here affixed by means of a rigid link 300 connected between the lower end of elevator 22 and the free end of arm member 11. Because of the slotted section 36 at the upper end of elevator 32 and due to the fact that link 300 connecting the lower end of elevator 22 and arm member 11 is pivotally hinged at both ends thereof, the elevator 22 is still capable of being moved upwardly and outwardly if a boulder or large obstruction is being loaded over the scraper blade 30 of vehicle 10. It should be noted that arm member 11 of vehicle 10 in FIG. 5 is shaped differently from the arm member 11 of FIGS. 1 through 3. This follows from the difference in the mounting of elevator 22, as described above. The remaining structure of the vehicle of FIG. 5 is identical to that of the vehicle of FIGS. 1-3.

Referring now to FIG. 6 of the drawings, another embodiment of an earth-moving machine according to the invention is shown and will now be described. Like numerals have been employed where possible, with the addition of the suffix "a". Looking at FIG. 6, a vehicle 10a for moving earth and other materials is illustrated. This vehicle 10a, like the ones shown in FIGS. 1-5, includes a pair of spaced-apart parallel longitudinally extending sidewalls 12a (of which only one is shown). Walls 12a like those of the vehicle 10 of FIG. 1 of the drawings are preferably inclined outwardly from the vertical at the lower end thereof. In this case sidewalls 12a are interconnected in the conventional manner by a stationary rear wall 14a which extends transversely between the sidewalls 12a. To further insure against the packing of material within bowl 18 upon the dumping thereof it may be necessary to pivotally mount the rear wall to the sidewalls as in the case of rear wall 14 of FIG. 1. This, however, depends on the consistency of the material being loaded and carried by the vehicle. An elevator 22a and horizontal rearwardly extending conveyor assembly 32a, of a known type, are provided to lift earth and other materials 20a into a bowl 18a defined by a base or bottom wall 16a which is supported by sidewalls 12a. The elevator 22a like that of the previously described figures, is rotated in the direction of the arrow 24a and lifts the earth materials 20a into bowl 18a by means of a plurality of slats or bars 26a mounted on elevator 22a. A scraper blade 30a extends between the sidewalls 12a and is connected thereto to lift materials 20a upwardly for engagement by slats 26a of elevator 22a. Conveyor assembly 32a then moves the earth, and other materials gathered by elevator 22a, rearwardly in the bowl or container 18a.

As in the case of the vehicle 10 of FIGS. 1-5, a yoke or connector frame 34a connected to sidewalls 12a is provided for connection to a prime mover or tractor (not shown) to pull the vehicle 10a.

As can be seen in FIG. 6, the vehicle 10a is equipped with a movable base wall 16a according to the invention. The base wall 16a includes a forward section or end portion 38a and a rearward section or end portion 40a. The rearward end portion or section 40a of the base wall 16a is formed by a pair of relatively movable panels or support sections 44a and 46a, similar to sliding panel 59 of the vehicle 10 of FIG. 1, which are mounted for movement by a hydraulic drive assembly 48a of known construction. As is perhaps best seen in FIG. 7, the rearward panel 46a is connected to a first arm 50a which is mounted for telescopic movement relative to a second arm or cylinder 52a. The second arm 52a is in turn mounted for telescopic movement relative to a main cylinder 54a of the hydraulic drive 48a. The first arm 50a is connected to a forward end 57 of the rearward panel 46a. The second arm 52a is connected to a forward end 58a of the panel 44a.

The hydraulic drive 48a is of a known two-stage operation wherein the first arm 50a is moved telescopically into the second arm 52a, to move the first panel 46a relative to the second panel 44a while the second panel remains stationary. This rearward movement of the first panel relative to the second panel 44a results in the first panel being positioned beneath and in vertical alignment with the second panel, as shown in FIG. 8, to form a rear opening or aperture 60a through which the materials 20a can be emptied from a rear portion of the vehicle 10a. It should be noted that the first panel 46a is translated in a substantially horizontal plane forwardly from the closed position of FIG. 6 to the open position of FIG. 8, so that material which was previously supported on an upper surface of the panel 46a falls or is emptied downwardly through the opening 60a. As the material falls through the opening 60a it is engaged by an optionally adjustable leveling blade 64a which is mounted on the sidewalls 12a adjacent to rear wheels 66a of the vehicle 10a. The prime mover pulls the vehicle 10a forwardly on the rear wheels 66a so that the blade 64a levels and spreads the material emptied through the opening 60a.

The opening 60a is initially relatively small, being defined by a lower end portion 70a of the sidewalls 12a, a lower end portion 72a of the rear wall 14a and a rearward end portion 74a of the panel 44a. While being relatively small, this initial opening 60a enables material in the rear of the vehicle to be emptied first so that the center of gravity of the load carried by the vehicle 10a is shifted forwardly and the weight carried by the rear wheels 66a is decreased while there is a relatively slight decrease in the load transmitted by the yoke 34a to the prime mover (not shown). Thus, the movement of the panel 46a from the closed position of FIG. 6 to the open position of FIG. 8 provides an opening 60a through which material is emptied to decrease the weight and, consequently, the rolling resistance of the rear wheels 66a of the vehicle 10a. However, as in the vehicle 10 of FIG. 1, the weight transmitted to the prime mover is not substantially reduced, so that the rear wheels of the prime mover are pressed downwardly by the yoke frame 34a to maintain the traction capabilities of the prime mover.

After the panel 46a has been moved to the open position, as shown in FIG. 8, both the panels 44a and 46a are moved forwardly to the open position shown in FIG. 9, beneath the forward section 38a (see FIG. 6) of the vehicle 10a. This forward movement of both the panels 44a and 46a is accomplished by moving the drive arms 50a and 52a telescopically into the cylinder 54a, as shown in FIG. 9. The material supported by the forward panel 44a is emptied from the vehicle 10a through the opening 60a contemporaneously with this movement of the panel 44a to the open position shown in FIG. 9. The opening 60a is now relatively large and extends for a major portion of the length of the vehicle 10a so that the majority of the material 20a has been emptied from the bowl or container 18a by sliding or translating the panels 44a and 46a forwardly. The aperture or opening 60 a is now defined by the lower end portions 70a and 72a of the sidewalls 12a and the rear wall 72a and a rearward portion 78a of a panel 80a of the forward section 38a (see FIG. 9).

The relatively small amount of earth or other materials remaining in the vehicle 10a are emptied from the vehicle by pivoting both a forward panel 82a of the section 38a and the rearward panel 80a of the section 38a relative to each other from a closed position, shown in FIG. 6, to an open position, shown in FIG. 9. It should be noted that these panels 82a and 80a are similar in construction to panels 55 and 56 of the vehicle of FIG. 1. A second or forward opening 84a is now formed adjacent the the elevator assembly or structure 22a and the forward end of the vehicle 10a. The opening 84a is defined by the lower end portions 70a of the sidewalls 12a, a support member 86a for the scraper blade 30a and a forward end portion 88a of the panel 82a. The panels 80a and 82a are moved from the closed position of FIG. 6 to the open position of FIG. 9 by a second drive assembly 92a which includes a hydraulic cylinder 94a and arm or piston 96a.

As the arm 96a is telescopically retracted into the cylinder 94a the rearward panel 80a is pivoted rearwardly and upwardly in the direction of the arrow 98a (see FIG. 6) about a fixed axis of rotation 97a from the position shown in FIG. 6 to the position shown in FIG. 9. Contemporaneously with this upward and rearward rotation of the panel 80a, the forward panel 82a is pivoted downwardly and rearwardly in the direction of the arrow 104a (see FIG. 6) about a movable axis of rotation or hinge connection 106a between a rearward end portion of the panel 82a and a forward end portion of the panel 80a. During this rotational movement of the panels 80a and 82a the material supported by the panel 82a is emptied through the opening 84a. At least a portion of the material supported by the panel 80a is emptied through the rearward aperture 60a by the upward and rearward rotation of the panel 80a. It should be noted that the rearward and downward rotation of the panel 82a about the hinge 106a eliminates any possibility of the material supported by the panel 82a being jammed or compressed against the elevator assembly 22a where sticky material tends to hang up or adhere in prior art structures.

When the panels 44a, 46a, 80a and 82a are in the open position illustrated in FIG. 9, the panels 44a, 46a are positioned in a generally parallel horizontally extending relationship beneath the panels 80a and 82a which extend upwardly relative to the panels 44a and 46a. A triangular structure 110a, that is structure having a triangular cross section and extending between the sidewalls 12a of the container 18a, is then formed by the panels. The panels 44a and 46a provide a generally horizontal base or bottom of the triangular structure 110a while the panel 80a extends forwardly from the base panels 44a and 46a and is connected to the panel 82a which extends rearwardly from the base panels to provide the legs or sides of the triangular structure 110a. The triangular structure 110a is relatively compact and gives a minimum of resistance to the emptying of material from the bowl 18a of the vehicle 10a through the rearward opening 60a and the forward opening 84a.

In order to enhance the understanding of movable base wall 16a of the instant embodiment according to the invention, a modified version thereof is shown in FIGS. 11 and 12. In both the embodiments of FIGS. 6 through 10 and FIGS. 11 and 12, like numerals have been used to designate like parts with the suffix letter "a'" being employed in FIGS. 11 and 12 to distinguish the elements thereof. A vehicle 10a' for carrying earth and other materials is shown in FIGS. 11 and 12. The vehicle 10a' includes an elevator assembly 22a' for loading material scraped up by a scraper blade 30a' into a bowl or container 18a' of the vehicle. The bowl or container 18a' is defined by a pair of spaced-apart substantially parallel sidewalls 12a' which are interconnected by a rear wall 14a'. A base or bottom wall 16a' is supported by the sidewalls 12a'. The base wall 16a' includes a forward section or end portion 38a' and a rearward section or end portion 40a'.

The rearward end portion 40a' includes a panel 46a' which is mounted for translation from the closed position of FIG. 11 to the open position of FIG. 12 by a hydraulic drive assembly (not shown). When the panel 46a' is in the closed position of FIG. 11 the upper surface of the panel supports material which has been loaded into the bowl 18a' by the elevator assembly 22a'. When the panel 46a' is moved to an open position (see FIG. 12) beneath the panel 80a' of the forward section 38a', a first or rearward aperture 60a' is formed for emptying material from a rearward end portion of the vehicle 10a'. The aperture 60a' is defined by lower end portions 70a' and 72a' of the sidewalls 12a' and rear wall 14a' and a rearward end portion 78a' of a panel 80a'.

After the panel 46a' has been moved to the open position shown in FIG. 12 to empty material from the rearward end portion of the vehicle 10a', the panels 80a' and a panel 82a' are rotated relative to each other and the sidewalls 12a' from a closed position shown in FIG. 11 to an open position shown in FIG. 12. The panel 80a' is rotated upwardly and rearwardly about a fixed axis of rotation 97a from the closed position to the open position. Contemporaneously with this upward and rearward rotation of the panel 80a', the panel 82a' is rotated at a hinge connection or movable axis of rotation 106a' between the panels 80a' and 82a' from the closed position of FIG. 11 to the open position of FIG. 12. The panel 82a' is rotated downwardly and rearwardly to the open position contemporaneously with the upward and rearward rotation of the panel 80a' to form a forward opening or aperture 84a'. The opening 84a' is defined by a forward end portion 88a' of the panel 82a', the lower end portions 70a' of the sidewalls 12a' and a support member 86a' for the forward scraper blade 30a'. As the panels 80a' and 82a' are moved from the closed position to the open position material which is in the forward end portion of the vehicle 10a' is emptied through either the opening 60a' or the opening 84a' depending upon the orientation of the material relative to the axis of rotation 106a'.

When the panels 46a', 80a' and 82a' are in the open position of FIG. 12 they form, similar to that formed by panels 55 and 56 of FIG. 1, a structure 110a' having a generally triangular cross section. The structure 110a' results from the positioning of the panel 46a' adjacent to a lower or outer surface of the panel 82a'. Thus, the panel 46a' forms the base or bottom for the triangular structure 110a' while the panels 80a' and 82a' form the legs or sides for the triangular structure 110a'. The legs 80a' and 82a' slope downwardly toward the openings 60a' and 84a' to facilitate the emptying of material from the forward end portion of the vehicle through the openings 60a' and 84a'.

For purposes of affording a more complete understanding of the invention, it is advantageous now to provide a functional description of the mode in which the component parts cooperate. The vehicle 10a is loaded with material 20a by cooperation in a known manner between the elevator 22a and the scraper blade 30a. The material 20a is moved rearwardly in the bowl 18a of the vehicle 10a by the horizontal conveyor 32a. When the material 20a is to be dumped or emptied from the vehicle 10a an opening 60a will first be formed adjacent to the rear wall 14a of the vehicle. The panel 46a will be moved forwardly from the closed position of FIG. 6 to the open position of FIG. 7 to form the opening 60a through which the material 20a will be at least partially emptied from the rearward end portion 40a of the vehicle. The panel 44a and the panel 46a will then be translated contemporaneously to the position shown in FIG. 9 to increase the size of the opening 60a and will enable a substantially larger portion of the material 20a to be emptied from the bowl 18a. The material supported by the forward panels 80a and 82a will then be emptied from the bowl 18a by pivoting the panel 80a upwardly and rearwardly around the fixed axis of rotation 97a while the panel 82a is pivoted downwardly and rearwardly at the hinged connection 106a between the panels to form a second forward opening 84a. The panel 82a will then be closely adjacent to the forward ends of the panels 44a and 46a to form the triangular structure 110a which has legs sloping toward the openings 60a and 84a to offer relatively little resistance to the emptying of the material in the forward end portion of the vehicle.

It should be noted that the material will be emptied sequentially forwardly from the rearward end portion of the vehicle 10a. Thus, the rearwardmost panel 46a is opened first to form the opening 60a adjacent to the rear wall 14a of the vehicle through which material 20a is initially emptied. The panel 44a is then slid or translated, contemporaneously with the panel 46a, to the open position of FIG. 9 to increase the size of the opening 60a and to further empty the bowl of the vehicle. After the rearward end portion of the vehicle has been emptied, the forward panels 80a and 82a are rotated from the closed position of FIG. 8 to the open position of FIG. 9 to empty the forward portion of the vehicle. As mentioned above, this sequentially forwardly emptying of the vehicle 10a progressively reduces the weight on the rear wheels 66a of the vehicle by relatively large increments to decrease the rolling resistance of the wheels 66a. Since the forward end portion of the vehicle is emptied last, the weight transmitted by the yoke frame 34a to the prime mover is progressively reduced in relatively small increments to maintain the downward force on the rear wheels of the prime mover, and consequently the traction capabilities of the prime mover. Of course, the materials emptied through either the forward opening 84a or the rearward opening 60a are spread and leveled by the blade 64a.

It is contemplated that the vehicle 10a will be particularly advantageous for handling sticky material, such as gumbo and clay earths. The rearwardly and downwardly rotational movement of the forward panel 82a from the closed position of FIG. 6 to the open position of FIG. 9 will enable the sticky material supported by the panel 82a to be emptied from the vehicle without compressing the sticky material against the elevator structure 22a where it tends to cling or hang up in a packed body which is difficult to empty from the vehicle. Also, the triangular structure 110a which is formed by the panels 44a, 46a, 80a and 82a when the panels are in the open position will resist adherence of the sticky material to the open panels. In addition, the sequential translational movement of the panels 44a and 46a will be particularly advantageous with sticky materials. When the panel 46a is moved from the open position to the closed position there is only a sliding engagement, and consequently little frictional resistance, between the upper surface of the panel 46a and the materials within the vehicle 10a. Of course, as the panel 46a is progressively moved toward the open position this frictional resistance decreases. The panel 44a is then moved toward the open position of FIG. 9 with only relative sliding movement between the upper surface of the panel 44a and the materials remaining in the vehicle 10a. If the panels 40a and 46a were moved contemporaneously from the closed position to the open position there would be initial sliding frictional engagement between the entire upper surfaces of both the panels 44a and 46a and the material 20a which would tend to greatly impede the movement of the panels.

It is contemplated that the panels 44a, 46a, 80a and 82a of the bottom or base wall 16a will be mounted on a track or guide rail structure similar to that set forth in the aforementioned U.S. Pat. No. 3,343,286. However, it will be obvious to those skilled in the art that other suitable types of guide rail may be satisfactorily used instead.

With reference now to FIGS. 13 and 14 of the drawings, there is shown a vehicle 10d similar to the vehicle 10 shown in FIGS. 1 through 5 of the drawings. The differences to be brought out herein lie in the base or bottom wall 16d of the vehicle. It can be seen that like the vehicle of FIG. 1 a forwardly sliding rear panel 59d is provided in the rear portion of section 40d of base wall 16d. This panel like its counterpart 59 in the vehicle 10 of FIG. 1 is moved forwardly by means of an hydraulic assembly 51d. This assembly 51d also, like its counterpart 51 in FIG. 1, comprises a substantially vertically oriented member 95d which is attached near its center to an hydraulic cylinder 91d and is also attached at one end thereof to a horizontal member 93d which in turn is connected to sliding panel 59d. Just as in the case of panel 59, upon the operation of the hydraulic cylinder assembly 51d, panel 59d is made to slide forward to an open position. Unlike the vehicle of FIG. 1, which in the forwardmost section 38 of base wall 16 comprises a pair of hinged panels, the instant vehicle 10d is provided with a rearwardly sliding panel 219d at the forwardmost end of the front section 38d and a raised center portion 221d mounted for rotational movement about hinge 237d at the rearward end of the forward section 38d. A rear wall section 14d which like rear wall section 14 of FIG. 1 is pivotally mounted on sidewalls 12d, is also provided in the vehicle of FIG. 13. As can be seen, pairs of wiper blades 223d and 225d are attached to pivotally mounted rear wall 14d and a third pair of wiper blades 227d is attached in a vertically oriented position to the center portion 221d.

The sequence of operation of the various panels during the dumping process is as follows. As in the case of vehicle 10 of FIG. 1, first the rear sliding door 59d is moved to its open position beneath portion 221d of section 38d to provide an opening 60d through which the earth or other material 20d gathered in the loading process into bowl 18d can be emptied. As in the other base wall variations shown above, the movement of the forward sliding rear door 59d dumps the material from the rear of vehicle 10d first so that the weight reduction due to such dumping is effective at wheels 66d of the vehicle 10d, and effects only a minimal weight reduction on the rear wheels of the tractor or prime mover (not shown), which is pulling the earth-moving vehicle 10d. Thus, again the traction required by the prime mover is only minutely affected, whereas the weight of the loaded vehicle has been reduced substantially. Subsequent to rearward panel 59d being slid forward to an open position, rear vertical wall 14d is, by means of hydraulic cylinder 70d rotated rearwardly about point 15d thereof, to enlarge opening 60d so that materials which might not have been dumped upon moving rear panel 59d now may be discharged from the rear of vehicle 10d. Any materials which might have been stuck to sidewalls 12d, such as clay, etc., are wiped clean by means of wiper blades 223d and 225d attached to rear wall 14d, as shown in FIGS. 13 and 14. The remaining materials in bowl 18d are dumped when forward panel 219d is moved rearwardly by means of a hydraulic assembly 310d, similar to that which operates rear sliding door 59d. As panel 219d is moved rearwardly to an open position beneath center portion 221d, vertically above rearwardly sliding panel 59d, a cam member 229d mounted on the forward end of rearwardly sliding panel 219d slidably acts upon curved leg 235d beneath center portion 221d causing center portion 221d to rotate in a counterclockwise manner, as shown in FIGS. 13 and 14, about hinged pivot point 237d at the forward end of center portion 221d, so as to, by means of blade 227d mounted thereon, wipe any materials clinging to the interior sides of walls 12d of the forward portion of bowl 18d. This movement of forward panel 219d to the rear allows the material 20d piled thereon to first be dumped and thereafter through the camming action of center portion 221d removes any materials remaining in the forward section of bowl 18d. Furthermore, as center portion 221d is rotated about point 237d, materials piled thereupon at the rearward end thereof will tend to be dumped from bowl 18d through aperture or opening 60d already provided by the movement of panel 59d and rear wall 14d.

To more clearly understand the operation of the bottom or base wall 16d and pivotally mounted rear wall 14d, reference should be made to FIG. 14 of the drawings which shows these walls in their opened position. The relation of cam member 229d of front rearwardly sliding panel 219d and the curved leg 235d of the center portion 221d can be easily seen in FIG. 14. Elevator 22d in the vehicle 10d of FIGS. 13 and 14, may be of the kind shown in FIGS. 1 through 5 or of that type shown in FIGS. 6 through 12 of the drawings.

Looking now at FIG. 15 of the drawings, there is shown another embodiment of an earth-moving vehicle 10e according to the invention. This vehicle includes an elevator 22e pivotally mounted to the sidewalls 12e by means of brackets 155e attached to the sidewalls 12e and designed for receiving a rotatable rod member 156e, attached to elevator 22e at its upwardly extending end. Bracket 155e and its relation to sidewalls 12e and rod member 156e can best be seen in FIG. 18 of the drawings. The lower end of elevator 22e is mounted to side walls 12e in the conventional manner by means of a coiled spring 41e. The rear or vertical wall 14e as shown herein is transversely mounted between walls 12e. In this case, however, the rear wall 14e is stationary, as in the case of the rear wall 14a shown in FIGS. 6 through 12. The base wall 16e of vehicle 10e, like that of vehicle 10d shown in FIGS. 13 and 14, comprises a pair of sliding panels or doors 59e and 219e. One of the sliding panels 59e is mounted at the rear of the vehicle bowl 18e for forward movement, and the other sliding panel 219e is mounted at the forwardmost end of the forward section 38e of base wall 16e and is designed for rearward movement. The center portion or rear portion of the forward section 38e comprises a humplike member 330e which protrudes into bowl 18e. As in the case of the previously described vehicles, the sidewalls 12e may be toed out at the base wall, so that materials which might normally cling to the sidewalls will be slidably ejected upon the opening of the base wall 16e. During the dumping process the sequence of operation of the base wall is as follows. First, rear panel 59e is moved forwardly beneath hump member 330e. Door 59e is moved to its open position by means of an hydraulic assembly 51e such as the one described above. Upon the opening of panel or door 59e the materials thereon held in the rear section of bowl 18e are dumped first, thereby reducing the weight on the rear wheels 66e of vehicle 10e but not reducing by any appreciable amount the traction of the rear wheels of the prime mover. Next, front sliding door 219e is moved rearwardly beneath rear sliding door 59e which together come to rest beneath hump member 330e, as shown in FIG. 17 of the drawings. The movement of panel 219e to its open position allows first the materials piled directly thereon to be dumped from the forward section of bowl 18e and then the materials piled thereupon to be dumped through the forward section. Because of the manner in which center hump member 330e is shaped, materials piled directly thereon will fall to either side of the sloped surfaces 331e and 333e, out either rear opening 60e or forward opening 84e, respectively. Even sticky material such as gumbo, etc., because of the rounded shape of hump member 330e, will be easily discharged from the bowl 18e.

Looking at FIG. 16 of the drawings, which is a cross-sectional view taken along the lines 16—16 in FIG. 15, the rollers upon which sliding doors 59e and 219e run are shown in tracks 165e provided along the lower ends of sidewalls 12e. Each of the sliding panels 59e and 219e are provided with a respective track 165e for their corresponding rollers.

Referring now to FIG. 17 of the drawings, there is shown the vehicle 10e with its sliding doors 59e and 219e in an open position. Earth material 20e is shown being dumped through respective openings 60e and 84e as the vehicle is being pulled along by the prime mover. As mentioned above, the brackets 155e used to pivotally mount elevator 22e to sidewalls 12e can best be seen in FIG. 18 of the drawings. As will be noted, bracket 155e is attached to sidewall 12e and extends inwardly in bowl 18e of the vehicle. Rod member 156e which is attached to elevator 22e fits into bracket 155e in rotational relation thereto. The other end of rod 156e (not shown) likewise fits into another bracket 155e mounted on the other sidewall 12e (not shown).

With reference now to FIGS. 19–21 of the drawings, there is shown an embodiment 440 of an earth-moving vehicle which includes an arcuately adjustable leveling blade arrangement 442. The arrangement, as briefly mentioned above, is provided so that earth materials such as 444, being dumped from the vehicle 440, can be graded at a variety of levels.

Blade 464, as can be seen in FIG. 19, is pivotally mounted on the vehicle 440 by a pin or rod 446 at the lower rear end of the vehicle just in front of rear wheels 66 thereof. A cam member 448 is attached to the lower surface 450 for cooperation with the hydraulically operated cam member 451 pivotally attached by pin member 452 at the rear of the vehicle. A hydraulic cylinder unit 453 is mounted at one end thereof on a structural support 454 at the rear of the vehicle. The movable piston 456 thereof is pivotally attached by means of a pin member 455 to cam member 451. Also attached to the piston is one end of a Bowden wire arrangement 465; the other end 467 of the Bowden wire arrangement being attached through a pusher arm 471 to an indicator arm 457 of an indicating device 458 mounted on the upper side of one of the sidewalls 12 of the vehicle. The arm 457 is movable along a color-coded indicator plate 459 so that the vehicle operator can see at a glance the exact setting of the leveling blade. The fluid-operating mechanism (not shown) for the hydraulic cylinder which would be connected to the hoses 460 of the cylinder unit 453, is to be located in close relation to the vehicle operator so that he may change the setting of the blade when required.

Looking now at FIG. 20, the relation of cam members 448 and 451 can clearly be seen. As the vehicle 440 moves forward, earth material 444 being dumped from the vehicle pushes blade 464 to the leveling position chosen by the vehicle operator when he moves cam 451 to a desired position. In this figure the hydraulic cylinder piston 456 is fully retracted into unit 453 so that the blade 464 may be moved to its highest leveling position by the earth materials 444. Also, it will be noted that the Bowden wire arrangement 465 is completely retracted, thus indicating on indicator plate 459 that the leveling blade 464 is in the high leveling position.

FIG. 21 of the drawings shows best the indicator arrangement 458 including color-coded indicator plate 459 and indicator arm 457, here shown with a pointer portion 470 to indicate exactly the level setting of blade 464. Bowden wire arrangement 465, which operates the indicator arrangement in slave relation to the hydraulic cylinder unit 453 is also shown attached to arm 457 by means of pusher arm 471.

The leveling blade 464 shown in FIGS. 19–21 is of the type which is also elongatable so that extremely low grading is possible therewith. As will be noted, the blade is provided with an extendable section 475 which can be manually or automatically operated to be extended outwardly from the pivot point 446 of the blade. This extension-type leveling blade, however, is optional, for the arcuate adjustment arrangement described above may be used equally as well with a conventional nonextendable-type blade, such as 64 shown in the earlier discussed figures of the drawings.

Referring now to FIGS. 22–25 of the drawings, there are shown preferred bellcrank hydraulic cylinder arrangements 510 and 610 for operating the base wall dumping doors or panels 55, 56 and 59, respectively, of the vehicle of FIGS. 1 through 5. The arrangements can, if appropriately modified, also be used for operating the bottom dumping panels of other embodiments of the vehicles shown in the drawings and are therefore not restricted to the vehicle shown herein.

The bellcrank hydraulic cylinder arrangements as shown in FIGS. 22 and 23 are in the unoperated position with the doors 55, 56 and 59 closed. Each of the arrangements comprises a hydraulic cylinder, 511 and 512 and associated bellcranks 513 and 514 respectively.

Bellcrank 513 and hydraulic cylinder 511 serve to operate front panels 55 and 56. One end 515 of hydraulic cylinder 511 is connected to a sidewall 12 of the vehicle beneath the panels 55 and 56. The piston 516 of the cylinder, which is normally extended when the panels are closed, is pivotally connected to one arm 517 of the bell crank 513 which is pivotally connected to a vehicle support member 518 at the connection point 520 of the arms 517 and 521 of bellcrank 513. The support member 518 extends beneath the panel 56 at end 519 thereof where panel 56 is also pivotally attached to the upper surface 522 of the support member, as shown in FIG. 22. The free end 523 of arm 521 of bellcrank 513 is pivotally connected to an arm 524 at one end 527 of the latter, which in turn is pivotally connected at the other end 528 thereof to the panel 55 near the front end 525 of the latter. Thus, upon operation of the hydraulic cylinder 511, piston 516 is caused to be moved to a retracted position within the cylinder unit, toward the upper sidewall 12, as shown in FIG. 23, pivoting arm 517 clockwise about pivot point 520. The arm 521 of bellcrank 513 because it is rigidly connected in a fixed relation to the other arm thereof, follows in a clockwise direction so as to pull arm 524 rearwardly (toward the right-hand side of the page) to open panels 55 and 56, as shown in FIG. 24 of the drawings.

Bellcrank 514 and hydraulic cylinder 512 are employed to open rear door 59. One end 530 of hydraulic cylinder 512 is connected to sidewall 12 adjacent hydraulic cylinder 515. As will be noted, an extension 533 is used to correctly orient hydraulic cylinder 512 so that it efficiently operates to open panel 59. The piston 531, which is normally retracted into cylinder unit 512 when panel 59 is closed, is pivotally connected to one arm 532 of the bellcrank 514, which is pivotally mounted at the junction 534 of the arms 532 and 535 thereof to support member 518 adjacent the mounting of bellcrank 513. The other arm 535 is pivotally connected to a pair of pivotally interconnected arms 536 and 537 at end 538 of arm 536. The other free end 539 of arm 537 is attached to panel 59, so that upon the operation of hydraulic cylinder 512, piston 531 is extended, causing arms 532 and 535 of bellcrank 514 to move in a counterclockwise direction, as shown in FIG. 23, to in turn move panel 59 forward (to the left of the page) until it is in a position beneath opened doors 55 and 56, as shown in FIG. 24.

Attention is drawn to FIG. 25 where the positioning of the bellcrank hydraulic cylinder arrangement 510 in an operated (panels open) condition can be seen. Piston 531 of hydraulic cylinder 512 is extended and bellcrank 514 is moved counterclockwise from the position of FIG. 23 of the drawings. Also, piston 516 of cylinder 511 is retracted into the latter with bellcrank 513 turned in a clockwise direction from that as shown in FIG. 23 of the drawings. As can better be seen in FIG. 24, panels 55, 56 and 59 are in a closed position.

The bellcrank hydraulic cylinder arrangement described above is efficient in operation to effectively open or close the dumping panels 55, 56 and 59 sequentially, as described above; (i.e., rear panel 59 first, followed by panels 55 and 56). Furthermore, the bellcrank and hydraulic cylinders are relatively compact and therefore require little space on the vehicle.

It will be apparent to those skilled in the art that any number of sequentially opening base wall assemblies can be advantageously used in many different vehicles, and that likewise many different types of movable elevator arrangements may be advantageously used in combination with any one of the number of base wall assemblies and on many different vehicles. Therefore, while particular embodiments of earth-moving vehicles according to the invention have been shown, it should be understood that the invention is not limited thereto, since many modifications thereof may be made. It is therefore contemplated to cover by the appended claims any such modifications as fall within the true spirit and scope of the invention.

I claim:

1. A vehicle for transporting earth and other material and comprising: an open front bowl construction having bottom, side and rear walls; an elevator carried proximate said open front for loading material into said bowl; and mounting means for said elevator enabling the operating position thereof to be varied, said mounting means including: a pair of arm members with one said arm member being pivotally mounted to the exterior of each sidewall, drive means carried by said vehicle and operably connected with said arm members for effecting controlled pivotal movement thereof; and apparatus mounting said elevator to said arm members, said apparatus including means for producing controlled pivotal and translatory movement of the elevator relative to said arm members.

2. A vehicle according to claim 1 wherein said apparatus mounting the elevator to the arm members includes: a pair of link elements, one said element being disposed on each side of the bowl, and each said element having one end thereof pivotally connected to the elevator proximate an upper portion thereof and the other end pivotally attached to an adjacent arm member; and drive means carried by each said arm member and being operatively connected to the respective link element associated with said arm member to produce movement of said elevator relative to said arm member.

3. A vehicle according to claim 2, and further including an additional pair of link elements, one said element being disposed on each side of said bowl, each said element having one end pivotally connected to the elevator proximate a lower portion thereof and the other end pivotally connected to an adjacent arm member.

4. A vehicle according to claim 2, and further including a pair of roller members carried by said elevator on opposite sides proximate a lower portion thereof, each said roller member being engaged with a surface on the adjacent arm member for movement therealong, and biasing means tending to force said rollers into contact with said surfaces on the arm members.

5. A vehicle according to claim 2 wherein said apparatus for mounting the elevator to said arm members includes spring means connected to said arm members and to said elevator adjacent the lower portion thereof, said spring means permitting said elevator to move upwardly relative to said arm members and the base wall of said bowl to facilitate the loading of material into said bowl.

6. A vehicle according to claim 2 wherein said drive means includes a pair of double-acting pistons, one being carried by each said arm member.

7. A vehicle for transporting earth and other material and comprising: an open front end construction having bottom, side and rear walls; an elevator structure carried proximate said open front for loading material into said bowl; and mounting means enabling the operating position of said elevator to be varied, said mounting means including a pair of arm members with one said member being pivotally mounted to said bowl on each side thereof, apparatus mounting said elevator to said arm members such that said elevator is free for both pivotal and translatory movement relative to said arm members, and drive means for effecting, alternately or jointly, controlled pivotal movement of said arm members and controlled translatory and pivotal movement of the elevator structure relative to said arm members.

8. A vehicle according to claim 7 wherein said drive means include first and second piston arrangements, said first piston arrangement being carried by the bowl construction and being operatively connected to said arm members to effect movement thereof relative to said bowl and said second piston arrangement being carried by said arm members and operatively connected to said elevator for effecting movement of said elevator relative to said arm members and said bowl.

9. A vehicle according to claim 8 wherein said apparatus for mounting the elevator to said arm members further includes a pair of link elements, each having one end thereof pivotally connected to the elevator on opposite sides thereof proximate an upper portion of said elevator, and the other end pivotally attached to an adjacent arm member, with the operative connection of said second piston arrangement to the elevator being effected by said link elements.

10. A vehicle according to claim 9 wherein said apparatus mounting said elevator to said arm members includes an additional pair of link members, each said member having an end pivotally connected to said elevator on opposite sides thereof, with the other end of said link elements being pivotally connected to the arm members.

11. A vehicle according to claim 9 wherein a slidable connection is provided between said elevator and said link elements.

12. A vehicle according to claim 7 wherein said apparatus for mounting the elevator to said arm members further includes a pair of rollers carried on opposite sides of said elevator proximate a lower end portion thereof, said rollers being engaged with surfaces on the adjacent arm members for movement therealong, and spring means connected to both said elevator and said arm members tending to bias said rollers into contact with said surfaces.

13. A vehicle according to claim 7 wherein said apparatus for mounting the elevator to said arm members includes spring means connected to said arm members, and to said elevator adjacent the lower portion thereof, said spring means permitting said elevator to move upwardly relative to said arm members and said bottom wall of said vehicle to facilitate the loading of material into said vehicle.

14. A vehicle according to claim 7 wherein said apparatus mounting the elevator to the arm members includes: a first pair of link elements, one said element being disposed on opposite sides of said elevator and having one end pivotally connected thereto at an upper portion thereof, the other end of said elements being pivotally connected to an adjacent arm member; and a second pair of link elements each disposed on opposite sides of said vehicle, one end of each said second pair being pivotally connected to said elevator proximate a lower portion thereof, with the other end being pivotally connected to an adjacent arm member.

15. A vehicle according to claim 14, wherein said drive means includes piston means carried by said arm members and operatively connected to said first pair of link elements, such that the operation of said piston means produces movement of the elevator relative to said arm members.

* * * * *